United States Patent
Oshino et al.

(10) Patent No.: US 11,209,974 B2
(45) Date of Patent: Dec. 28, 2021

(54) STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD FOR DETERMINING A CORRECTION OFFSET FOR A DRAGGED OBJECT

(71) Applicant: NINTENDO CO., LTD., Kyoto (JP)

(72) Inventors: Yosuke Oshino, Kyoto (JP); Yusaku Shimizu, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 166 days.

(21) Appl. No.: 16/375,998

(22) Filed: Apr. 5, 2019

(65) Prior Publication Data

US 2019/0310751 A1 Oct. 10, 2019

(30) Foreign Application Priority Data

Apr. 10, 2018 (JP) .............................. JP2018-075340

(51) Int. Cl.
*G06F 3/0486* (2013.01)
*A63F 13/2145* (2014.01)
*G06F 3/0488* (2013.01)

(52) U.S. Cl.
CPC ........ *G06F 3/0486* (2013.01); *A63F 13/2145* (2014.09); *G06F 3/0488* (2013.01); *G06F 3/04883* (2013.01); *A63F 2300/1075* (2013.01)

(58) Field of Classification Search
CPC .. G06F 3/0486; G06F 3/0488; G06F 3/04883; A63F 13/2145; A63F 2300/1075
See application file for complete search history.

(56) References Cited

U.S. PATENT DOCUMENTS

2009/0207144 A1    8/2009  Bridger
2010/0262907 A1*  10/2010  Shoemaker ........... G06F 3/0481
                                                                715/702
(Continued)

FOREIGN PATENT DOCUMENTS

JP      2011-145779        7/2011
JP      2015-69226         4/2015
WO      2015/071947 A1     5/2015

OTHER PUBLICATIONS

[Online] "Super Mario Maker", Nintendo Co., Ltd., http://supermariomaker.nintendo.com/make-it/, searched on Feb. 20, 2018—printed Mar. 15, 2019, 8 pages.

(Continued)

*Primary Examiner* — Daniel Samwel
(74) *Attorney, Agent, or Firm* — Nixon & Vanderhye PC

(57) ABSTRACT

An example of an information processing apparatus causes an object displayed on a display device to move based on a drag operation performed by a user. The information processing apparatus acquires input coordinates of the drag operation performed on the object. The information processing apparatus calculates a change amount of the input coordinates from when the drag operation has been started. The object moves based on the input coordinates during the drag operation. The information processing apparatus causes the object to move while performing a correction to make the object away from the input coordinates so that a distance between the input coordinates and coordinates of the object becomes larger in a case where the change amount is large than in a case where the change amount is small.

21 Claims, 21 Drawing Sheets

(56) References Cited

U.S. PATENT DOCUMENTS

| | | | |
|---|---|---|---|
| 2010/0275033 A1* | 10/2010 | Gillespie | G06F 3/0488 713/182 |
| 2011/0018827 A1* | 1/2011 | Wang | G06F 3/0482 345/173 |
| 2011/0169753 A1* | 7/2011 | Shimamura | G06F 3/0486 345/173 |
| 2011/0265022 A1* | 10/2011 | Kamiyama | G06F 3/0486 715/769 |
| 2014/0176498 A1* | 6/2014 | Yanase | G06F 3/0418 345/174 |
| 2014/0210797 A1* | 7/2014 | Kreek | G06F 3/03545 345/179 |
| 2014/0282269 A1 | 9/2014 | Strutt et al. | |
| 2015/0261373 A1* | 9/2015 | Smus | G06F 3/044 345/174 |
| 2016/0253042 A1* | 9/2016 | Niwa | G06F 3/04812 345/157 |
| 2016/0364137 A1* | 12/2016 | Ren | G06F 3/04883 |
| 2017/0153785 A1* | 6/2017 | Glaser | G06F 3/04812 |
| 2017/0336966 A1* | 11/2017 | Morton | G06F 3/0485 |
| 2018/0088786 A1* | 3/2018 | Abzarian | G06F 3/04883 |

OTHER PUBLICATIONS

Office Action dated Sep. 11, 2020 issued in JP Application No. 2018-075340 (3 pgs.).
Extended European Search Report dated Aug. 19, 2019 issued in European Application No. 19168184.0 (10 pages).

* cited by examiner

Fig.19

| INFORMATION PROCESSING PROGRAM |
| --- |
| DRAG OPERATION INFORMATION |
| CHANGE AMOUNT INFORMATION |
| OPERATION HAND INFORMATION |
| CORRECTION VECTOR INFORMATION |
| OBJECT INFORMATION |

STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD FOR DETERMINING A CORRECTION OFFSET FOR A DRAGGED OBJECT

CROSS REFERENCE TO RELATED APPLICATION

The disclosure of Japanese Patent Application No. 2018-075340, filed on Apr. 10, 2018, is incorporated herein by reference.

FIELD

The technique shown here relates to a storage medium having stored therein an information processing program, an information processing apparatus, an information processing system, and an information processing method which cause an object displayed on a display device to move based on input coordinates.

BACKGROUND AND SUMMARY

A technique of causing a virtual object displayed on a display device to move based on an operation performed by a user, has been known. For example, an information processing system, which causes an object such as a block to move based on a drag operation performed by a user with his/her finger or a touch pen, has been known.

When a user performs such a drag operation on an object, the object to be dragged may be hidden behind an indicator (e.g., a finger, a touch pen, or a cursor), which may make the operation difficult for the user.

Therefore, the present application discloses a storage medium having stored therein an information processing program, an information processing apparatus, an information processing system, and an information processing method which improve operability of a drag operation.

(1) An example of a storage medium described in the present specification is a non-transitory computer readable storage medium having stored therein an information processing program that causes an object displayed on a display device to move based on a drag operation performed by a user. The information processing program causes a computer of an information processing apparatus to function as input coordinate acquisition means, change amount calculation means, and object moving means. The input coordinate acquisition means acquires input coordinates of the drag operation performed on the object. The change amount calculation means calculates a change amount of the input coordinates from when the drag operation has been started. The object moving means causes the object to move based on the input coordinates during the drag operation. The object moving means causes the object to move while performing a correction to make the object away from the input coordinates so that a distance between the input coordinates and coordinates of the object becomes larger in a case where the change amount is large than in a case where the change amount is small.

According to the configuration of the above (1), when the change amount is large, the object is placed so as to be relatively largely away from the input coordinates, whereby the object during the drag operation can be displayed in an easy-to-view manner. On the other hand, when the change amount is small, the distance between the object and the input coordinates is made relatively small (may be 0), whereby the user can easily perform a drag operation of slightly moving the object. Thus, operability of the drag operation can be improved.

(2) The input coordinate acquisition means may repeatedly acquire the input coordinates during the drag operation. The change amount calculation means may calculate the change amount, based on a difference from the input coordinates at which the drag operation is started to the input coordinates at present.

According to the configuration of the above (2), the change amount is calculated based on the start position where the drag operation has been started, whereby the user can easily know the start position during the drag operation. The terms "calculating the change amount based on the difference" means both a mode in which the difference is used as the change amount and a mode in which some calculation result using the difference (e.g., calculation result using the difference and a movement distance described below) is used as the change amount.

(3) The object moving means may place the object at coordinates that are obtained by correcting the input coordinates by using a correction amount based on the change amount. The object moving means may calculate the correction amount, based on a maximum value of the difference during the drag operation.

According to the configuration of the above (3), even when the change amount is decreased during the drag operation, the object can be easily maintained in the easy-to-view state. Thus, operability of the drag operation can be improved.

(4) The change amount calculation means may calculate the change amount, based on an accumulated movement distance of the input coordinates during the drag operation.

According to the configuration of the above (4), the user can cause the object to be displayed at an easily visible position by increasing the accumulated movement distance due to the drag operation. The terms "calculating the change amount based on the accumulated movement distance of the input coordinates" means both a mode in which the accumulated movement distance is used as the change amount and a mode in which some calculation result using the accumulated movement distance (e.g., calculation result using the aforementioned difference and the accumulated movement distance) is used as the change amount.

(5) The object moving means may cause the object to move while maintaining a positional relation between the input coordinates and coordinates of the object, during a period in which the change amount is equal to or smaller than a threshold value from when the drag operation is started.

According to the configuration of the above (5), when the user hardly moves the input position from the start position during the drag operation (i.e., when the user does not intend to move the input position), the likelihood that the object is placed at a position away from the input position can be reduced. Thus, the likelihood that the user feels uncomfortable with the drag operation can be reduced.

(6) The object moving means may set an upper limit on the distance between the input coordinates and the coordinates of the object during the drag operation.

According to the configuration of the above (6), it is possible to reduce the likelihood that the object is too far from the position of input performed by the user and thereby the user cannot easily recognize the relation between the input position and the object.

(7) In a case where the input coordinates at which the drag operation is started are on the same side as a direction of the correction with respect to an axis that passes a reference position within the object, the object moving means may set an amount of the correction during the drag operation to be larger on the same side as the direction of the correction, as compared to a case where the input coordinates are on a side opposite to the direction of the correction with respect to the axis.

According to the configuration of the above (7), the correction amount can be controlled according to the position where the drag operation has been started in the object, whereby the object can be easily displayed at an easily visible position.

(8) The object moving means may place the object at a position, in an image displayed on the display device, in an obliquely upper direction with respect to the input coordinates during the drag operation.

According to the configuration of the above (8), the object can be displayed at a position that is unlikely to be hidden behind the finger of the user performing the drag operation, whereby operability of the drag operation can be improved.

(9) The information processing program may further cause the computer to function as determination means which determines whether a hand of the user performing the drag operation is a right hand or a left hand. The object moving means may place the object at a position in an upper left direction with respect to the input coordinates during the drag operation when the hand of the user performing the drag operation has been determined to be the right hand. The upper left direction is set based on an image displayed on the display device. The object moving means may place the object at a position in an upper right direction with respect to the input coordinates during the drag operation when the hand of the user performing the drag operation has been determined to be the left hand. The upper right direction is set based on the image displayed on the display device.

According to the configuration of the above (9), the object can be displayed in an easy-to-view manner regardless of whether the drag operation is performed by the left hand or the right hand, whereby operability of the drag operation can be improved.

(10) At least on a condition that the input coordinates during the drag operation or the coordinates of the object are at a position within a first distance from an end of a display region of the display device, the object moving means may adjust at least one of a direction and an amount of the correction so that a position, of the object, based on the correction approaches the end.

According to the configuration of the above (10), user can easily place the object at an end portion of the display region.

(11) In a case where the input coordinates during the drag operation or the coordinates of the object are within the first distance from the end of the display region and the direction of the correction before being adjusted is opposite to a direction from the input coordinates to the end of the display region, the object moving means may adjust the direction of the correction so that the position, of the object, based on the direction of the correction approaches the end.

According to the configuration of the above (11), user can easily place the object at an end portion, of the display region, on the opposite side to the correction direction before being adjust.

(12) At least on a condition that the input coordinates during the drag operation are at a position within a second distance from the end of the display region of the display device, the object moving means may decrease the amount of the correction.

According to the configuration of the above (12), user can easily place the object at an end portion of the display region.

(13) While the respective input coordinates or the respective coordinates of the object from when the drag operation has been started are within a range of a third distance in a normal direction of a display region of the display device from an end of the display region, the object moving means may place the object at coordinates that are obtained by correcting the input coordinates during the drag operation, in a direction perpendicular to the normal direction, according to a correction amount based on the change amount.

According to the configuration of the above (13), when the drag operation is performed within the range of the third distance in the normal direction from the end of the display region, the object can be displayed in an easy-to-view manner, and the likelihood that the object moves in a direction different from the user's intention can be reduced.

(14) While the respective input coordinates or the respective coordinates of the object from when the drag operation has been started are within a range of a forth distance from an end of a display region of the display device, the object moving means may place the object at the position of the input coordinates during the drag operation.

According to the configuration of the above (14), when the drag operation is performed within the range of the forth distance in the normal direction from the end of the display region, the likelihood that the object moves in a direction different from the user's intention can be reduced.

(15) The input coordinate acquisition means may repeatedly acquire the input coordinates. When the input coordinates are acquired again within a first time period from when the input coordinates of the drag operation have become not to be acquired, the change amount calculation means may continuously calculate the change amount for the drag operation.

According to the configuration of the above (15), even when the input coordinates temporarily become not to be acquired during the drag operation for some reasons, the user can continue the drag operation.

(16) The input coordinate acquisition means may acquire the input coordinates from a touch panel provided on a screen of the display device.

(17) Another example of a storage medium described in the present specification is a non-transitory computer readable storage medium having stored therein an information processing program that causes an object displayed on a display device to move based on a drag operation performed by a user. The information processing program causes a computer of an information processing apparatus to function as input coordinate acquisition means, elapsed-time calculation means, and object moving means. The input coordinate acquisition means acquires input coordinates of the drag operation performed on the object. The elapsed-time calculation means calculates an elapsed time from when the drag operation has been started. The object moving means causes the object to move based on the input coordinates during the drag operation. The object moving means causes the object to move while performing a correction to make the object away from the input coordinates so that a distance between the input coordinates and coordinates of the object becomes larger in a case where the elapsed time is long than in a case where the elapsed time is short.

According to the configuration of the above (17), when the elapsed time is long, the object is placed so as to be relatively largely away from the input coordinates, whereby the object during the drag operation can be displayed in an easy-to-view manner. On the other hand, when the elapsed time is short, the distance between the object and the input coordinates is made relatively small (may be 0), whereby the user can easily perform a drag operation of slightly moving the object. Thus, operability of the drag operation can be improved.

This specification discloses examples of an information processing apparatus and an information processing system including the respective means described in the above (1) to (17). In addition, this specification discloses an example of an information processing method to be executed in the information processing apparatus (or the information processing system) in the above (1) to (17).

According to the storage medium having stored therein the information processing program, the information processing apparatus, the information processing system, and the information processing method, operability of a drag operation can be improved.

These and other objects, features, aspects and advantages of the exemplary embodiment will become more apparent from the following detailed description when taken in conjunction with the accompanying drawings.

BRIEF DESCRIPTION OF THE DRAWINGS

FIG. 19 shows examples of various types of information used for an object moving process in a non-limiting game system;

DETAILED DESCRIPTION OF NON-LIMITING EXAMPLE EMBODIMENTS

[1. Configuration of Game System]

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
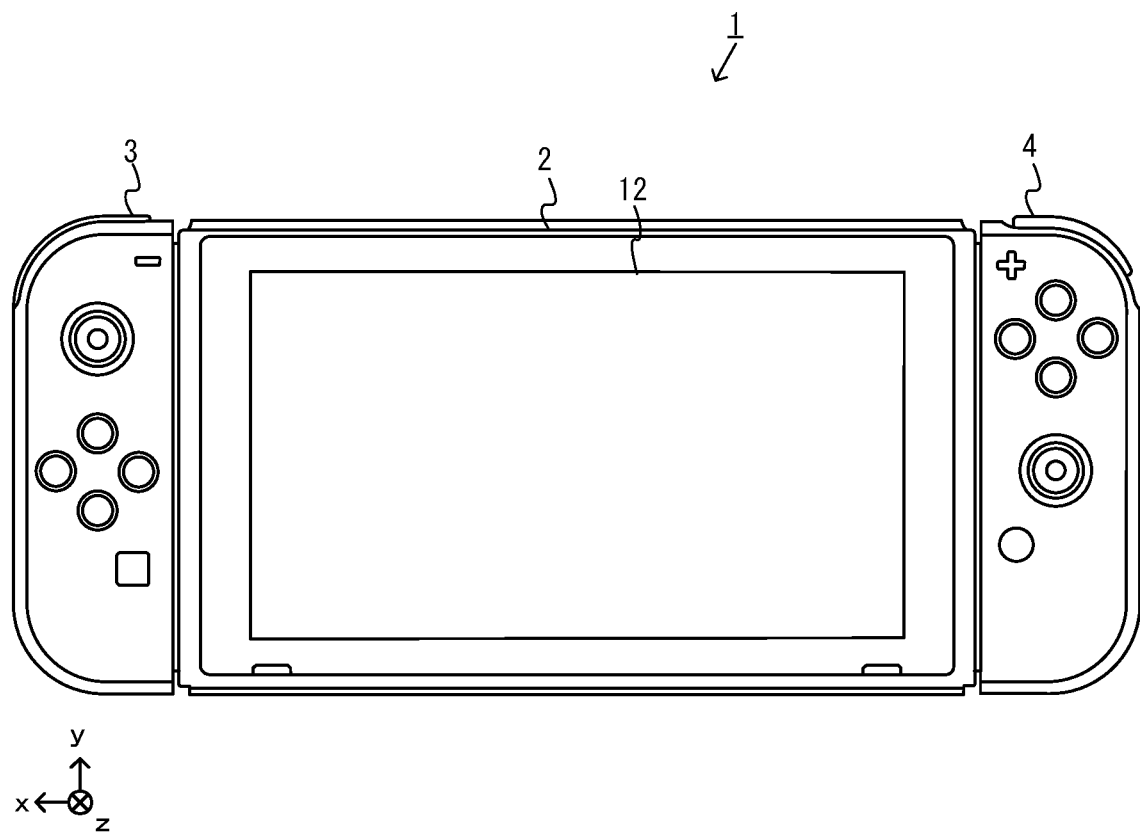
FIG. 1 is a diagram showing an example of a state where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
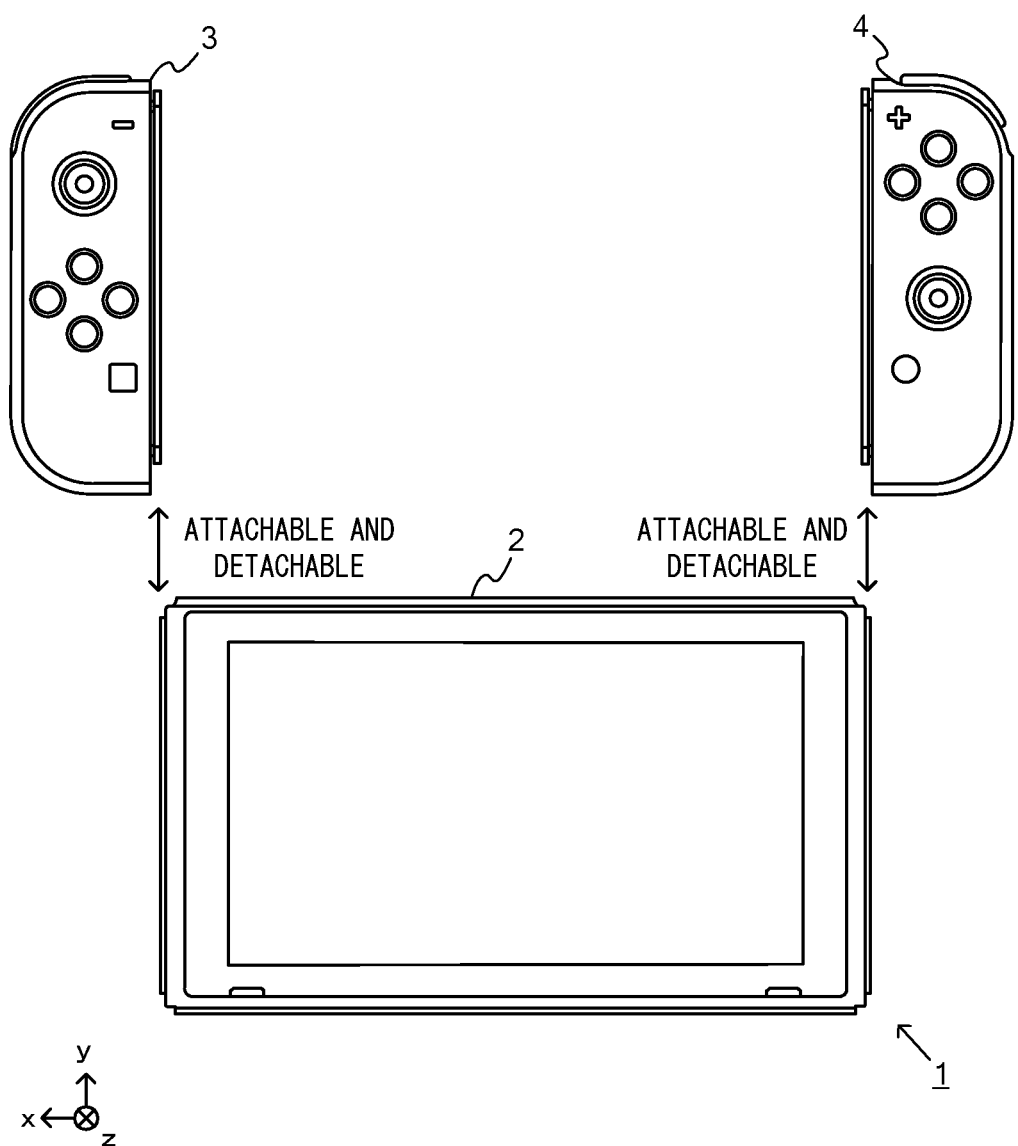
FIG. 2 is a diagram showing an example of a state where each of the non-limiting left controller and the non-limiting right controller is detached from the non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
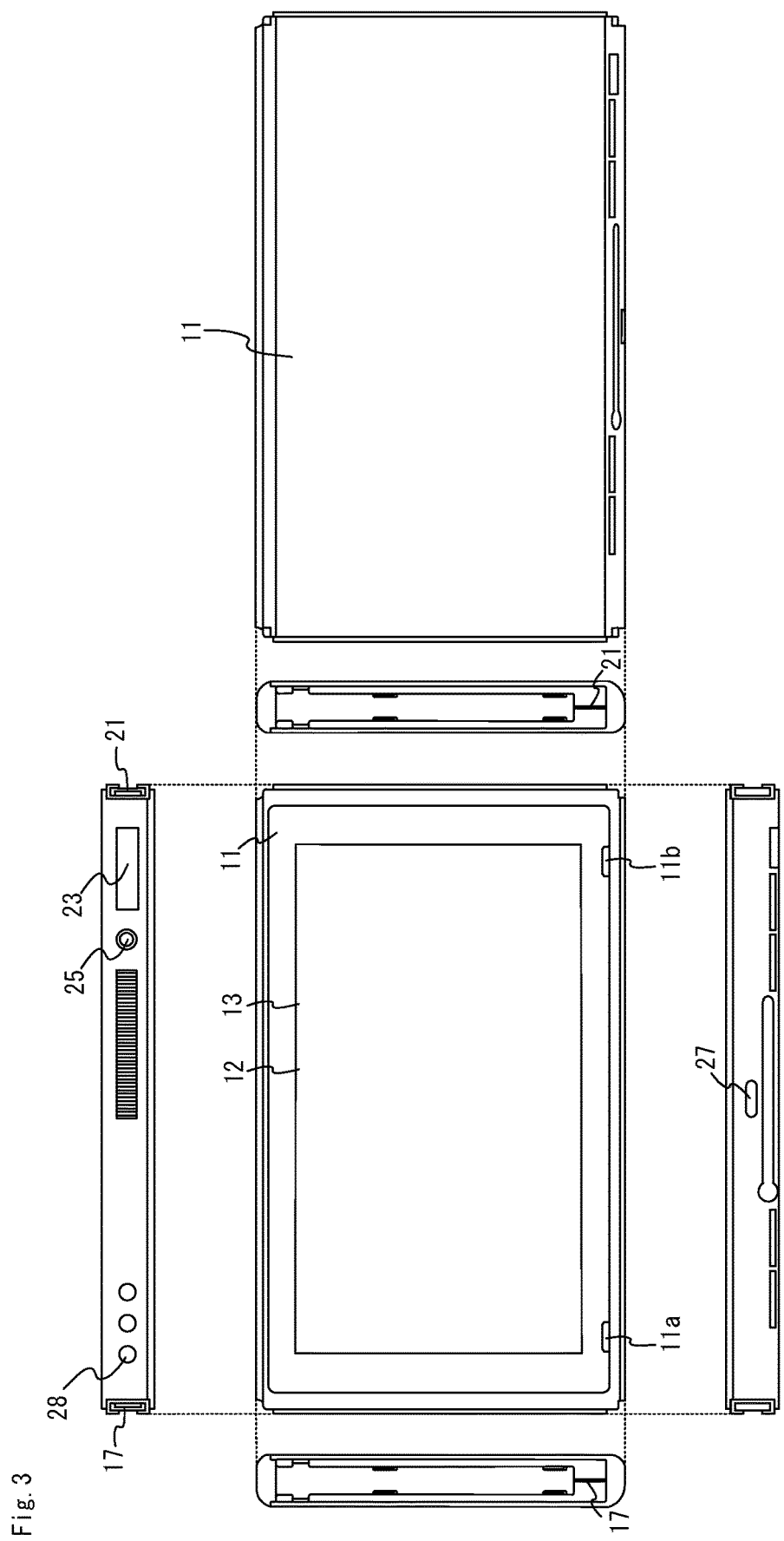
FIG. 3 is six orthogonal views showing an example of the non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
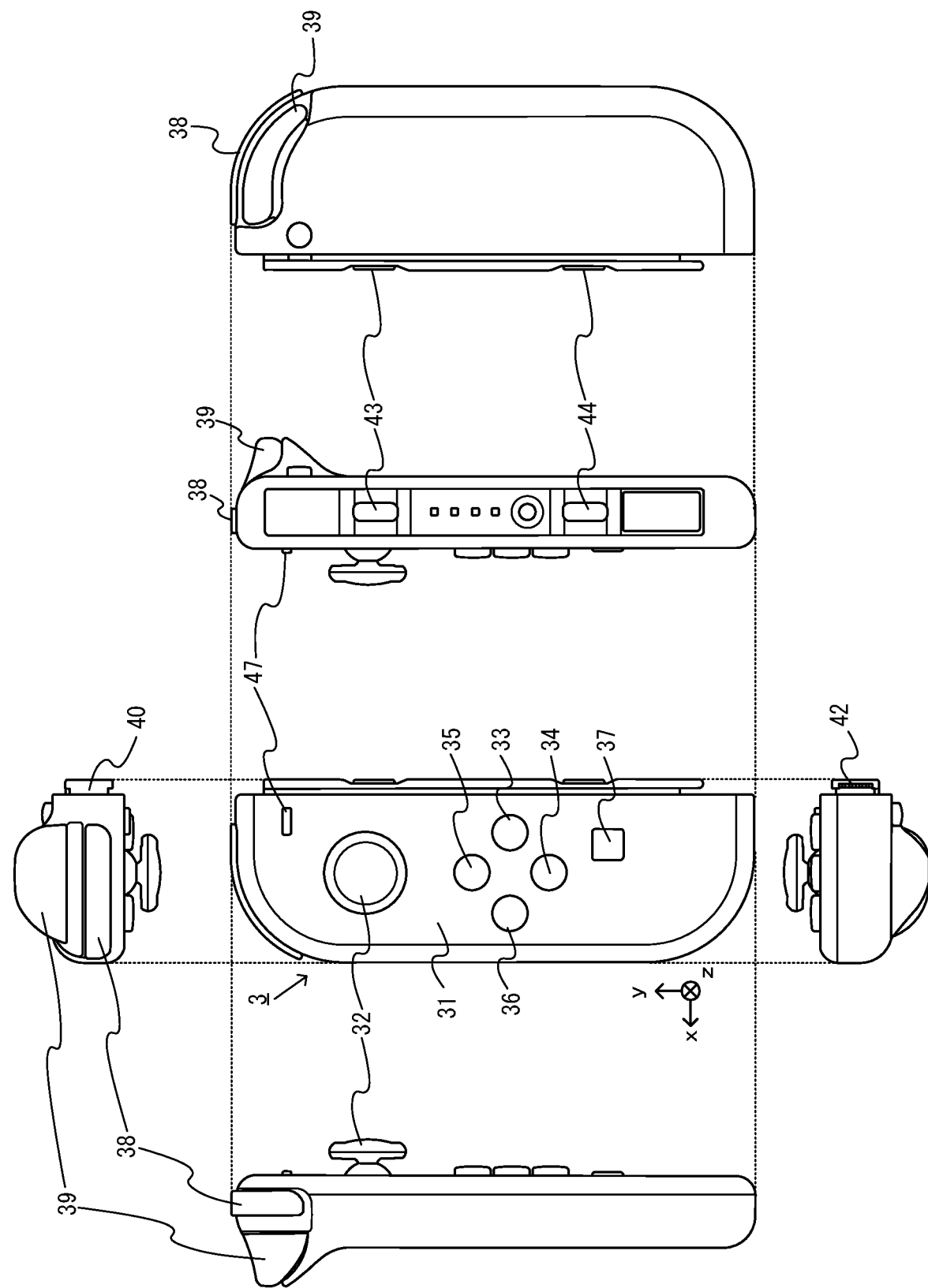
FIG. 4 is six orthogonal views showing an example of the non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
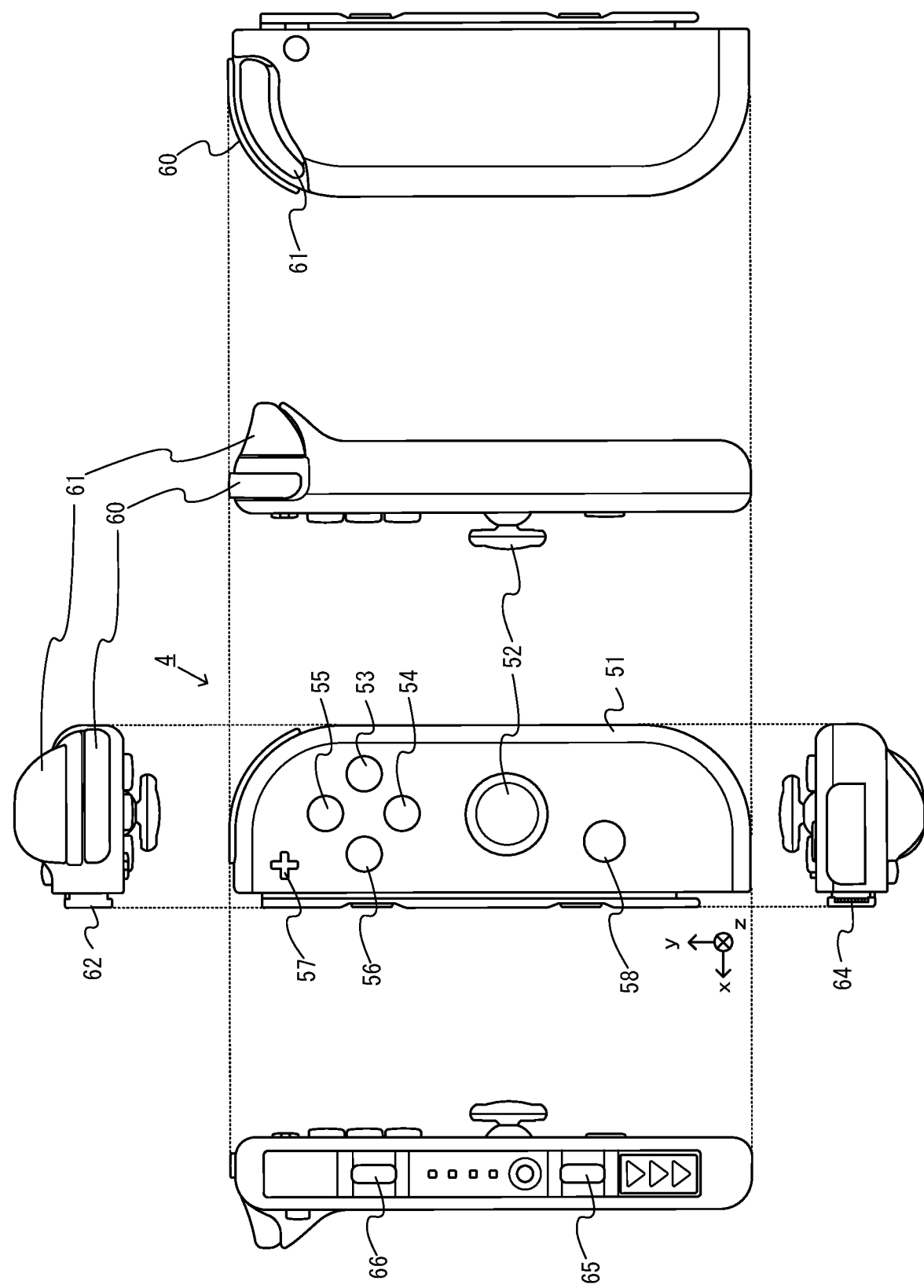
FIG. 5 is six orthogonal views showing an example of the non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
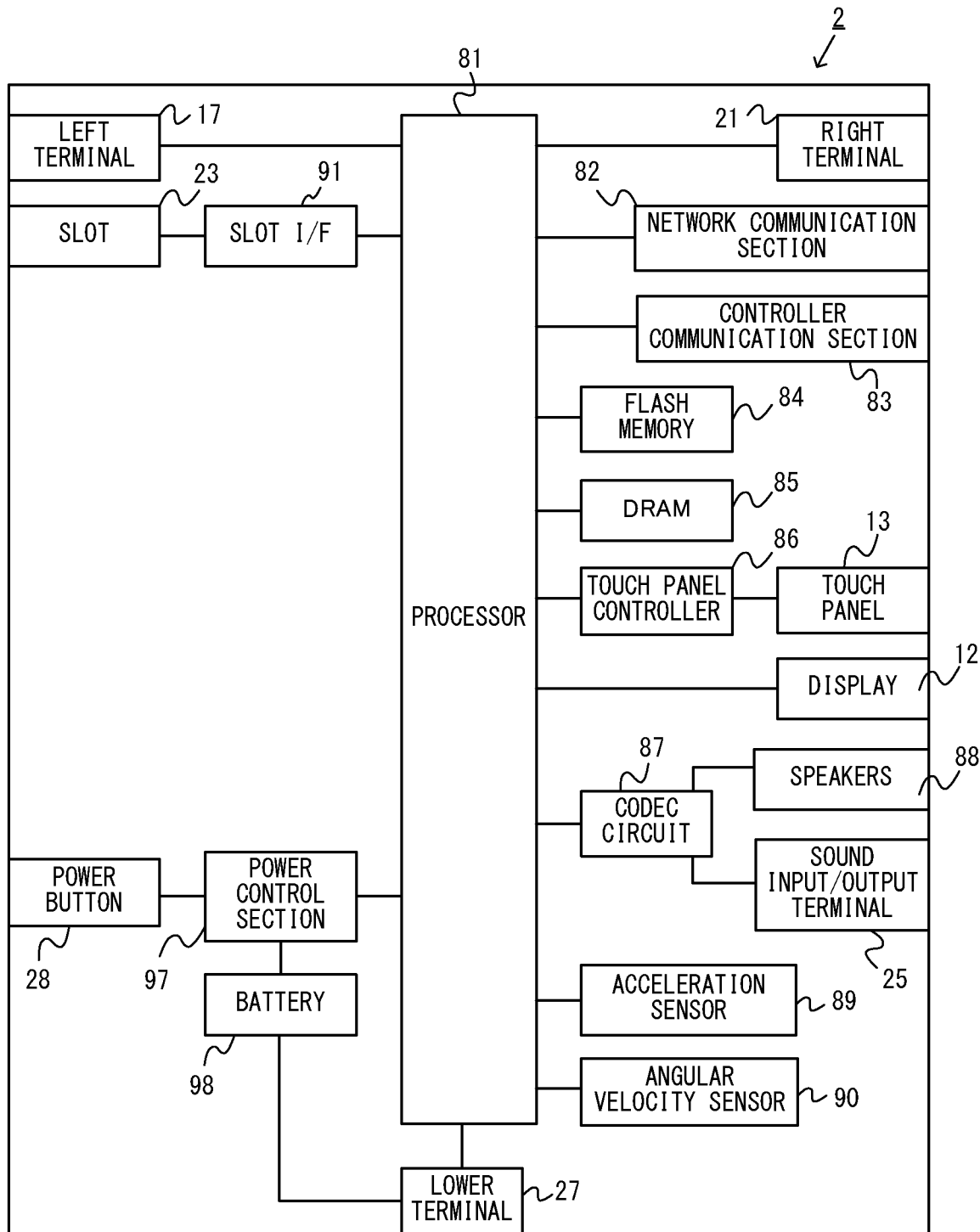
FIG. 6 is a block diagram showing an example of the internal configuration of the non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
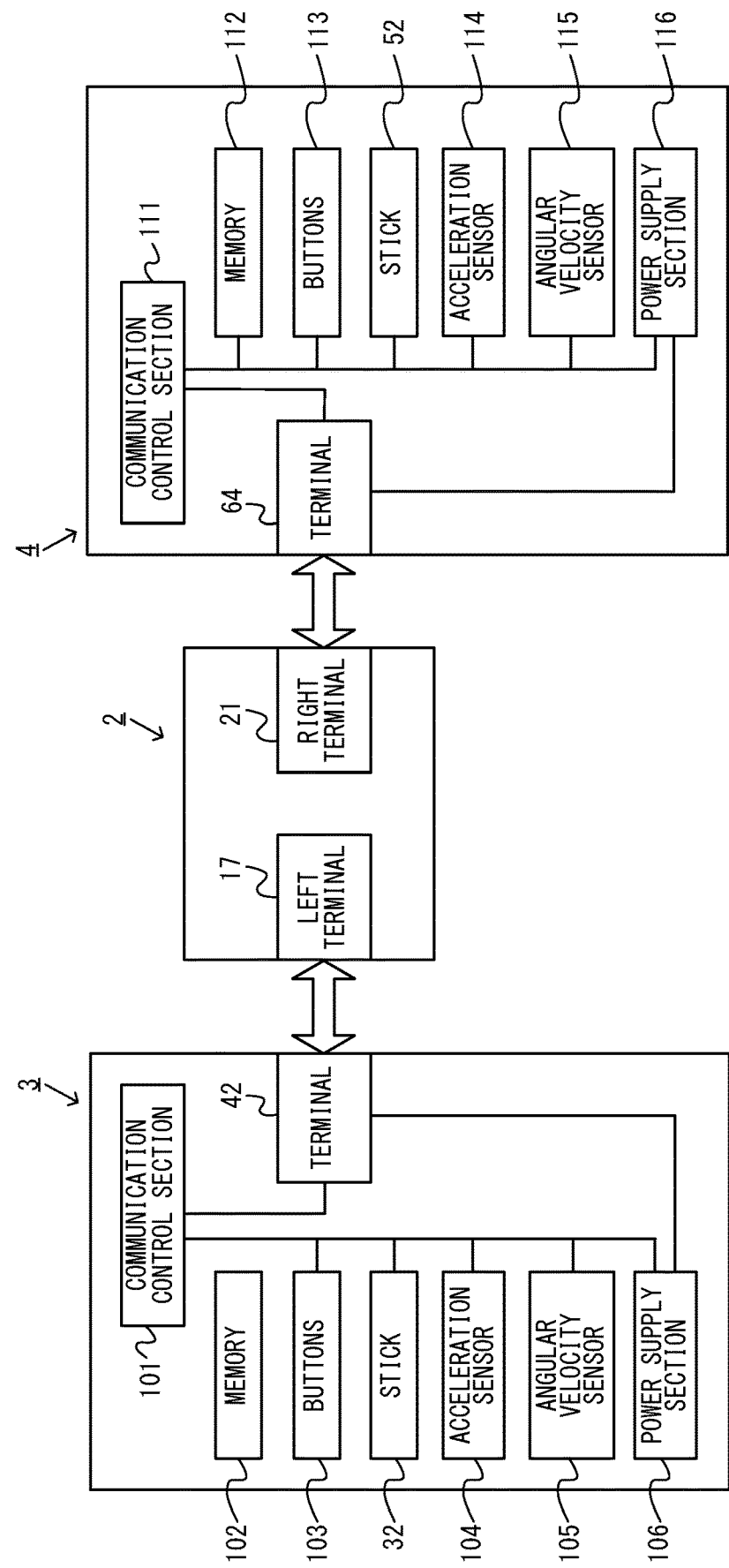
FIG. 7 is a block diagram showing examples of the internal configurations of the non-limiting main body apparatus, the non-limiting left controller, and the non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 106. In the exemplary embodiment, the power supply section 106 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 116. The power supply section 116 has a function similar to that of the power supply section 106 of the left controller 3 and operates similarly to the power supply section 108.

[2. Outline of Processing in Game System]

[2-1. Outline of Processing]

Hereinafter, an outline of information processing executed by the game system 1 according to the exemplary embodiment will be described with reference to FIG. 8. In the exemplary embodiment, the game system 1 executes a process of causing an object displayed on the display 12 to move based on a drag operation performed by a user.

The "drag operation" is, for example, an operation of, subsequently to an input that designates the position of an operation target (e.g., an object), moving the input position while continuing the input. In the exemplary embodiment, the game system 1 receives a drag operation performed on the touch panel 13 disposed on the screen of the display 12. However, in another embodiment, the input device on which a drag operation is performed is not limited to a touch panel. For example, in the another embodiment, the game system 1 may be provided with a pointing device such as a mouse, and may receive a drag operation that is performed with the pointing device. As described above, the input device for performing a drag operation may be an input device (e.g., a touch panel) that allows the user to directly designate an object on the screen (with his/her finger or a touch pen), or may be an input device (e.g., a mouse) that allows the user to indirectly designate an object on the screen with a cursor (in other words, a pointer).

Figure 8:
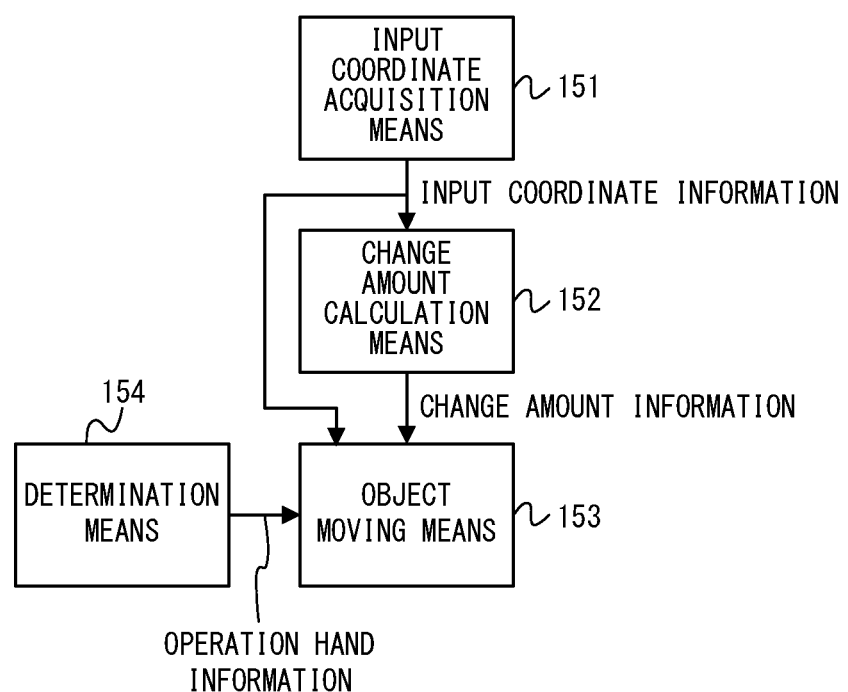
FIG. 8 is a block diagram showing an example of a functional configuration of a non-limiting game system.

FIG. 8 is a functional block diagram showing an example of a functional configuration of the game system 1. In the exemplary embodiment, the game system 1 includes input coordinate acquisition means 151, change amount calculation means 152, object moving means 153, and determination means 154. In the exemplary embodiment, the above means 151 to 154 are implemented by the processor 81 of the main body apparatus 2. Specifically, the means 151 to 154 are implemented when the processor 81 executes an information processing program that is stored in a storage medium accessible by the processor 81. The "storage medium accessible by the processor 81" may be a storage medium attached to the slot 23 or the flash memory 84, for example.

The input coordinate acquisition means 151 acquires input coordinates of a drag operation performed on an object. The "input coordinates" of the drag operation are coordinates indicating the position of an input of the drag operation (in the exemplary embodiment, a touch input on the touch panel 13). The input coordinates are information with which a position on the screen of the display 12 can be specified, and specifically are coordinates in a coordinate system indicating the position on the screen. In the exemplary embodiment, the input coordinate acquisition means 151 repeatedly acquires input coordinates once every predetermined time from the input device (i.e., the touch panel 13). The input coordinate acquisition means 151 outputs input coordinate information indicating the acquired input coordinates.

The change amount calculation means 152 acquires the input coordinate information, and calculates a change amount of the input coordinates from start of the drag operation. Further, the change amount calculation means 152 outputs change amount information indicating the calculated change amount. In the exemplary embodiment, the "change amount" is a distance from the input coordinates at the time point when the drag operation is started to the input coordinates at present during the drag operation (in other words, input coordinates acquired last). In the following description, the input coordinates at the time point when the drag operation is started are referred to as "start coordinates", and the input coordinates at present during the drag operation are referred to as "current coordinates". In addition, the distance (in other words, difference) from the start coordinates to the current coordinates is referred to as "drag distance".

The change amount is not limited to the drag distance, and may be another index. For example, in another embodiment, the change amount calculation means 152 may calculates, as a change amount, the length of a movement locus of input coordinates from start of a drag operation (in other words, an accumulated movement distance of the input coordinates during the drag operation). In the exemplary embodiment, the change amount is an index indicating a change in input coordinates within a period from start of a drag operation to the present time point during the drag operation, and is not an index indicating an amount of change at one time point during the drag operation (e.g., a moving speed of the input coordinates at a certain time point).

The object moving means 153 acquires the input coordinate information and the change amount information. Then, the object moving means 153 moves the object on the screen of the display 12, based on the input coordinates during the drag operation and on the change amount. Although details will be described below, the object moving means 153 moves the object to the position based on the current coordinates during the drag operation. That is, the object moves in accordance with the movement of the input coordinates during the drag operation. In the exemplary embodiment, the object moving means 153 calculates a correction amount based on the change amount, and places the object at coordinates obtained by correcting the current coordinates by using the correction amount. That is, in the exemplary embodiment, the object is displayed at a position slightly shifted from the current coordinates. Although details will be described below, the likelihood of the object being hidden behind a finger of the user performing the drag operation can be reduced, whereby the object can be displayed in an easy-to-view manner.

The determination means 154 determines whether the hand of the user performing the drag operation is the right hand or the left hand. The determination means 154 may perform this determination by any method. In addition, the determination means outputs operation hand information indicating the right hand or the left hand. Although details will be described below, the object moving means 153 acquires the operation hand information, and changes the direction in which the object should be shifted, based on the operation hand information. Therefore, the direction in which the object is placed with respect to the current coordinates changes depending on whether the hand of the user performing the drag operation is the right hand or the left hand.

[2-2. Process of Moving Object]

[2-2-1. Outline of Moving Process]

Figure 9:
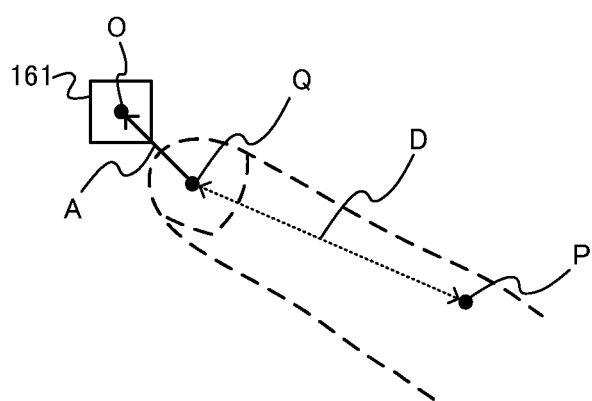
FIG. 9 shows an example of a method of calculating the position of an object.

With reference to FIG. 9, the outline of a process of moving an object according to a drag operation (i.e., calculating the position of the object based on input coordinates) will be described. FIG. 9 shows an example of a method of calculating the position of an object. FIG. 9 shows a case where a drag operation is performed on an object 161. Specifically, FIG. 9 shows a state where the drag operation, started at start coordinates P, has been performed up to current coordinates Q.

In the state shown in FIG. 9, the change amount calculation means 152 calculates, as change amount information, a drag distance D from the start coordinates P to the current coordinates Q. Next, based on the drag distance D, the object moving means 153 calculates a correction vector A for correcting the current coordinates Q. Although details will be described below, the magnitude of the correction vector A (i.e., a correction amount) is calculated according to the magnitude of the drag distance D, and is generally calculated such that the correction amount increases with increase in the drag distance D. In addition, the direction of the correction vector A (i.e., a correction direction) is set depending on whether the hand performing the drag operation is the right hand or the left hand.

The object moving means 153 corrects (in other words, moves) the current coordinates Q by using the correction vector A to calculate object coordinates O indicating the position of the object 161. As shown in FIG. 9, the object coordinates O are calculated as coordinates obtained by correcting the current coordinates Q by the magnitude of the correction vector A in the direction of the correction vector A (in FIG. 9, an upper left direction).

In FIG. 9, the object 161 is placed such that the position of the object coordinates O is the center thereof. However, in the exemplary embodiment, the object 161 is not necessarily placed in such a manner. In the exemplary embodiment, the object moving means 153 sets, as a placement reference position, the position of the start coordinates P in the region of the object 161. The object moving means 153 places the object 161 such that the placement reference position coincides with the position of the object coordinates O. However, in another embodiment, the object moving means 153 may place the object 161 such that a predetermined position in the object 161 (e.g., the center position, the position of the lower right corner, etc.) coincides with the position of the object coordinates O.

As described above, in the exemplary embodiment, the game system 1 can place the object 161 in the position shifted from the current coordinates Q. Thus, it is possible to reduce the likelihood that the object 161 is hidden behind the finger of the user performing the drag operation. If the object 161 is hidden behind the finger and is difficult to view, it may be difficult for the user to know the shape and/or the type of the object 161, and the accurate position of the object 161. According to the exemplary embodiment, the object 161 can be displayed in an easy-to-view manner, whereby operability of the drag operation can be improved.

[2-2-2. Calculation of Correction Amount]

Next, a process of calculating a correction amount will be described. In the exemplary embodiment, the correction amount (i.e., the shift amount from the current coordinates to the object coordinates) is variable. Specifically, the object moving means 153 changes the correction amount in accordance with the drag distance. Hereinafter, the process of calculating a correction amount will be described in detail.

Figure 10:
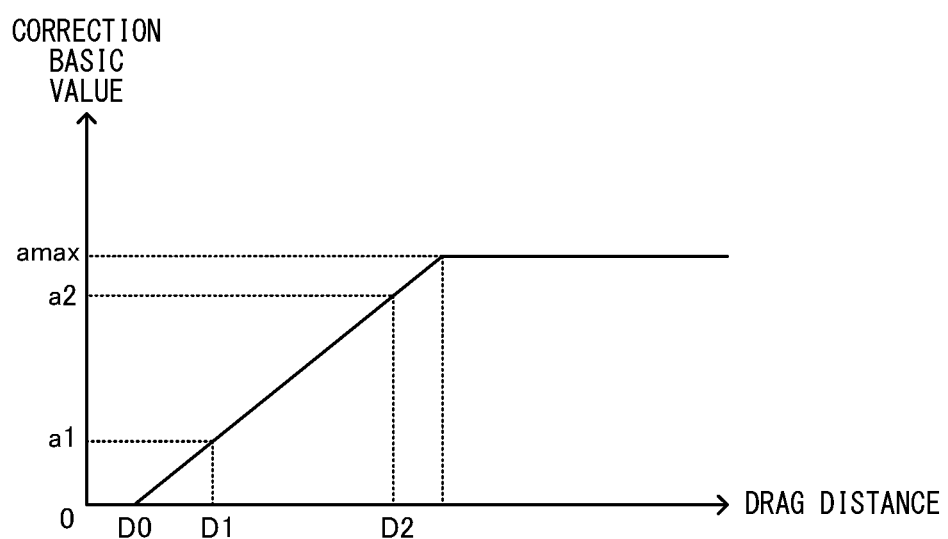
FIG. 10 shows an example of a relation between a drag distance and a correction basic value.

First, the object moving means 153 calculates a correction basic value, based on a drag distance. FIG. 10 shows an example of a relation between a drag distance and a correction basic value. As shown in FIG. 10, the correction basic value is calculated so as to increase with increase in the drag distance. However, in the exemplary embodiment, when the drag distance is equal to or smaller than a predetermined value (D0), the correction basic value is calculated to be 0. In addition, an upper limit (amax in FIG. 10) is set for the correction basic value. FIG. 10 shows an example in which the drag distance is proportional to the correction basic value (within a range in which the correction basic value increases with increase in the drag distance). However, a function indicating the relation between the drag distance and the correction basic value is not limited to a proportional function, and may be any function that causes the correction basic value to gradually increase as the drag distance increases. In the exemplary embodiment, the function indicating the relation between the drag distance and the correction basic value is a continuous function, and the correction basic value continuously changes according to continuous change in the drag distance.

Next, based on the calculated correction basic value, the object moving means 153 calculates a correction amount. In the exemplary embodiment, the correction amount is calculated as a maximum value of the correction basic value from start of a drag operation. That is, the object moving means 153 increases the correction amount according to update of the maximum value of the correction basic value from start of the drag operation (in other words, according to update of the maximum value of the drag distance). Therefore, the correction amount is not decreased even when the drag distance is decreased due to movement of the input coordinates in the direction approaching the start coordinates during the drag operation. Thus, in the exemplary embodiment, the object moving means 153 calculates the correction amount so as not to decrease during a single drag operation.

As described above, the correction basic value is 0 in the period during which the drag distance is smaller than or equal to the predetermined threshold value (D0) from start of the drag operation. Therefore, in this period, the correction amount is 0 and consequently the object coordinates are equal to the input coordinates, so that the object moving means 153 moves the object 161 while maintaining the positional relation between the input coordinates and the object coordinates (in the exemplary embodiment, with the input coordinates coinciding with the object coordinates). Thus, in a case where the user hardly moves the input position from the start coordinates during the drag operation, the object 161 is prevented from being placed at a position away from the input coordinates.

Since the upper limit is set for the correction basic value as described above, an upper limit is also set for the correction amount (specifically, the upper limit value for the correction basic value is the upper limit of the correction amount). Thus, the object moving means 153 sets an upper limit for the distance between the input coordinates (in other words, the current coordinates) and the object coordinates during the drag operation. By setting the upper limit, it is possible to reduce the likelihood that the object is too far from the position of input performed by the user and thereby the user cannot easily recognize the relation between the input position and the object. Thus, the object during the drag operation can be displayed in an easy-to-view manner, whereby operability of the drag operation can be improved.

The object moving means 153 repeatedly calculates the correction amount during the drag operation. Specifically, in the exemplary embodiment, the correction amount is calculated each time input coordinates (in other words, current coordinates) are acquired during the drag operation. However, in another embodiment, the object moving means 153 may calculate the correction amount every time when a predetermined number of input coordinates have been acquired during the drag operation. In another embodiment, interpolation may be performed using the respective input coordinates acquired during the drag operation. In this case, a correction amount may be calculated for the input coordinates obtained through the interpolation.

Figure 11:
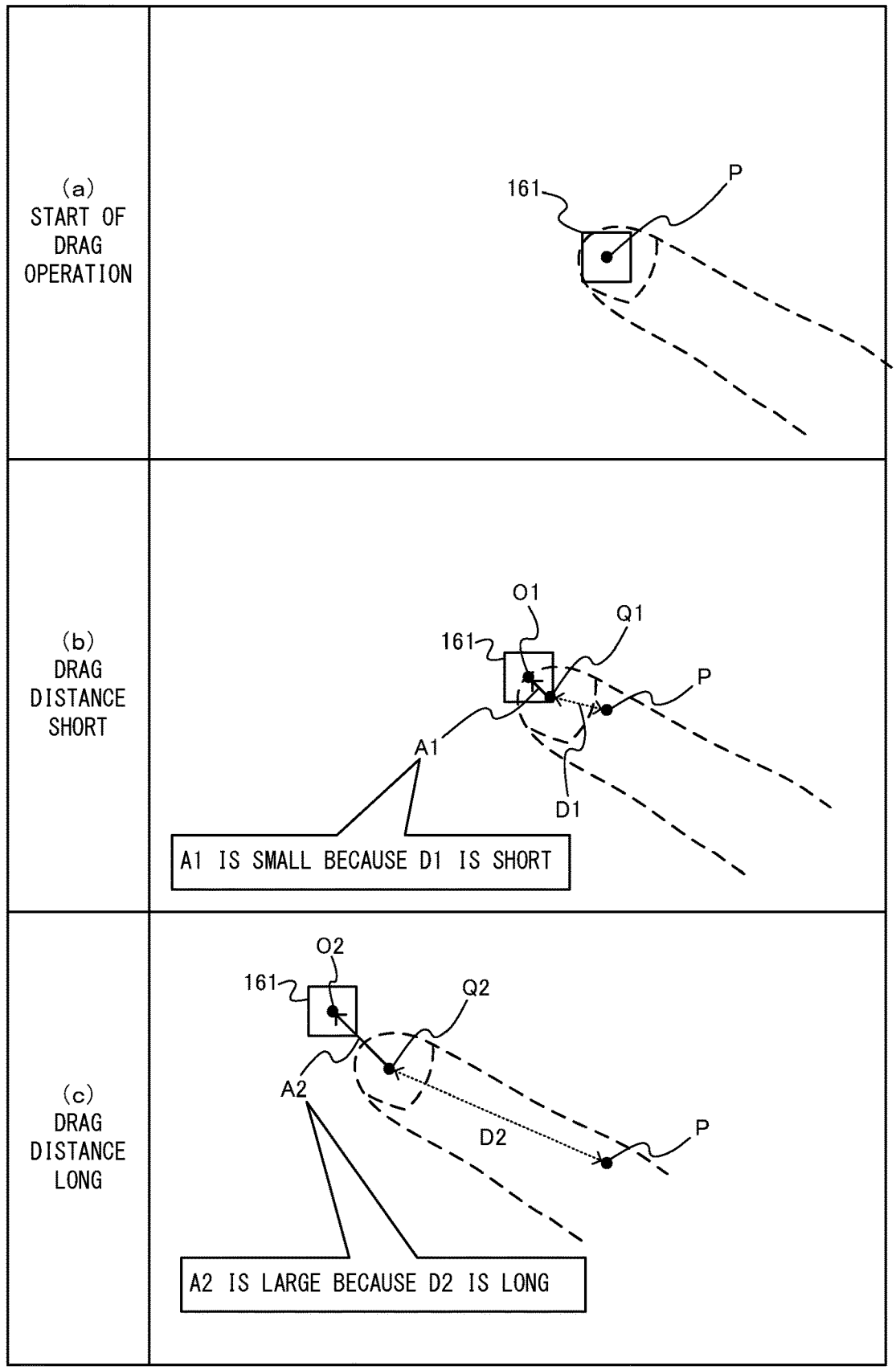
FIG. 11 shows an example of movement of an object in a case where a drag distance increases from start of a drag operation.

A specific example of a case where a correction amount is calculated as described above will be described with reference to FIGS. 11 and 12. FIG. 11 shows an example of movement of an object in a case where a drag distance increases from start of a drag operation.

In FIG. 11, (a) shows an object 161 at a time point when the drag operation is started. It is assumed that start coordinates P are at the center position of the object 161. When the input coordinates (in other words, the start coordinates) P are at a portion within the object 161, the object 161 is designated as an operation target of the drag operation.

In FIG. 11, (b) shows the object 161 at a time point when current coordinates Q1 slightly move from the start coordinates P (i.e., when the drag distance is small). In (b) of FIG. 11, since a drag distance D1 is relatively small, the correction basic value is also a small value (e.g., a1 in FIG. 10). As a result, the correction amount (i.e., the magnitude of a correction vector A1) has a relatively small value (i.e., a1). Therefore, object coordinates O1 are at a position slightly away from the current coordinates Q1, and the object 161 is placed at a position slightly shifted from the current coordinates Q1.

In FIG. 11, (c) shows the object 161 at a time point when current coordinates Q2 significantly move from the start coordinates P (i.e., when the drag distance is large). In (c) of FIG. 11, since a drag distance D2 is relatively large, the correction basic value is also a large value (e.g., a2 in FIG. 10). As a result, the correction amount (i.e., the magnitude of a correction vector A2) has a relatively large value (i.e., a2). Therefore, object coordinates O2 are at a position significantly away from the current coordinates Q2, and the object 161 is placed at a position significantly shifted from the current coordinates Q2.

As described above, the object moving means 153 places the object away from the input coordinates so that the distance between the input coordinates (in other words, the current coordinates) and the coordinates of the object 161 becomes larger in the case where the change amount is large (e.g., when the drag distance D=D2) than in the case where the change amount is small (e.g., when the drag distance D=D1). Therefore, in the exemplary embodiment, when the user has started a drag operation at a position and then continues the drag operation so as to be gradually away from the start position, the object is placed to be gradually away from the position of the touch input by the user (i.e., the input coordinates) while moving according to the drag operation.

In the state where the input coordinates have moved only a little after start of the drag operation (e.g., the state shown in (b) of FIG. 11), it is considered that the user intends to perform a delicate operation such as slightly moving the object as an operation target. Therefore, in the above state, if the amount of shift between the input coordinates and the object coordinates is too large, the user may feel difficulty in performing the operation. Taking this into consideration, in the exemplary embodiment, the correction amount is set to be small in the above state, so that the user can easily perform such a delicate operation.

Meanwhile, in the state where the input coordinates have moved a certain distance after start of the drag operation (e.g., the state shown in (c) of FIG. 11), it is considered that the user hardly intends to perform a delicate operation such as slightly moving the object. Therefore, in this state, the user may not feel uncomfortable even when the distance between the input coordinates and the object coordinates is increased to a certain extent. Thus, in the exemplary embodiment, visibility of the object is improved by setting the correction amount to be large.

As described above, according to the exemplary embodiment, the game system 1 changes the correction amount, between an initial stage where the drag operation is started and a stage subsequent to the initial stage, whereby the user can easily perform the drag operation in either stage. Thus, operability of the drag operation can be improved.

In the exemplary embodiment, the object moving means 153 continuously changes the correction amount in accordance with the continuous change in the input coordinates (FIG. 10). Thus, it is possible to reduce the likelihood that the position of the object suddenly changes during the drag operation, whereby operability of the drag operation can be improved.

Figure 12:
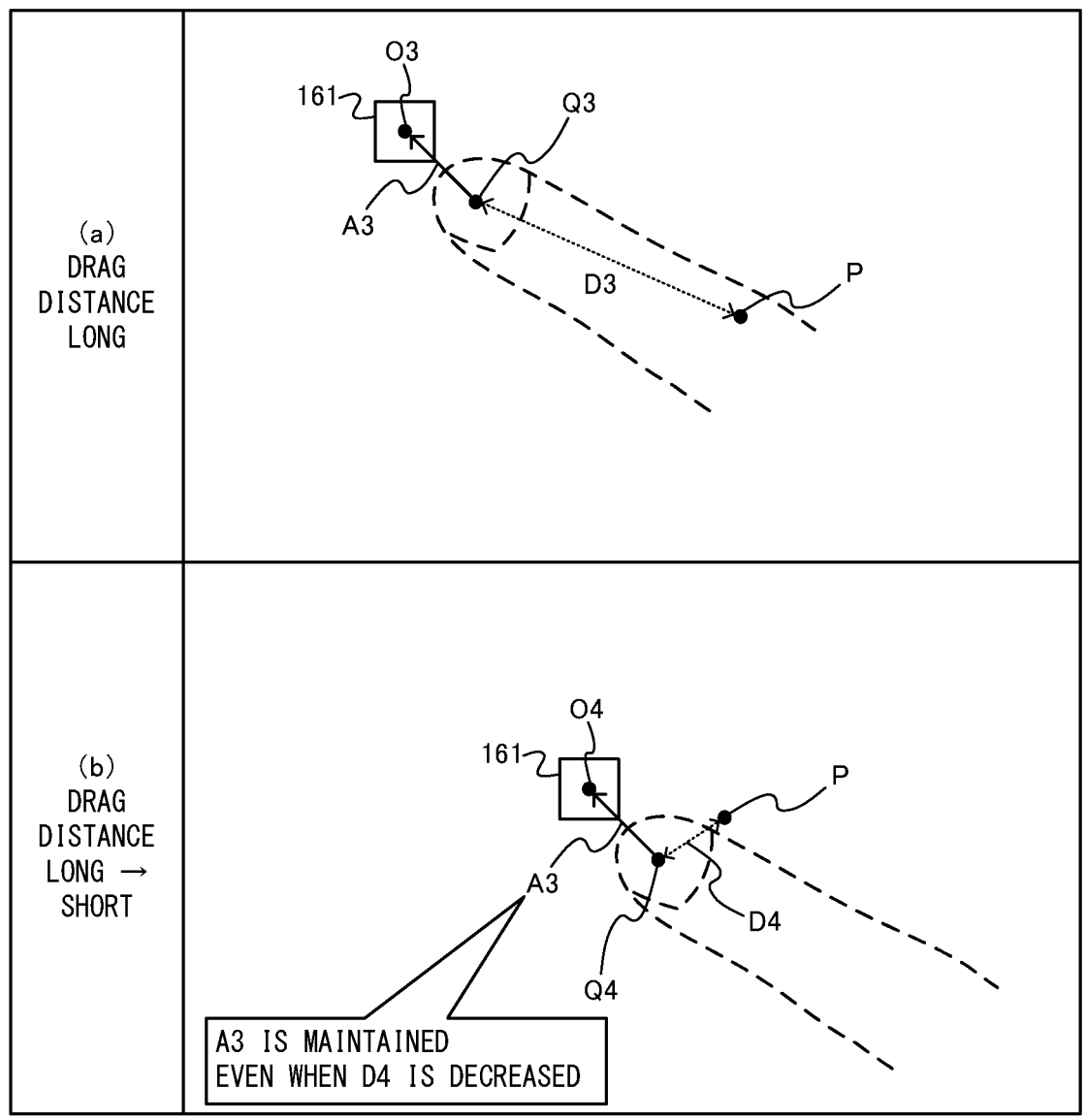
FIG. 12 shows an example of movement of an object in a case where a drag distance increases and then decreases.

FIG. 12 shows an example of movement of an object in a case where a drag distance increases and then decreases. In FIG. 12, (a) shows a state where a correction vector A3, which is equivalent in magnitude to a correction basic value a3 according to a drag distance D3, is calculated, and an object 161 is placed at object coordinates O3 based on the correction vector A3. In FIG. 12, (b) shows a state where the input coordinates have moved in the direction approaching the start coordinates P from the state shown in (a) of FIG. 12. Therefore, in the state shown in (b) of FIG. 12, a drag distance D4 is smaller than the drag distance D3.

In the state shown in (b) of FIG. 12, a correction basic value a4 is smaller than the correction basic value a3. However, since the correction amount is the maximum value of the correction basic value from start of the drag operation as described above, the correction amount (i.e., the magnitude of the correction vector A3) is maintained without being decreased in the above state. Therefore, in the state shown in (b) of FIG. 12, object coordinates O4 are at a position separated from current coordinates Q4 by the same distance as in the state shown in (a) of FIG. 12. That is, the amount of shift of the object 161 with respect to the current coordinates is the same in both the state shown in (a) of FIG. 12 and the state shown in (b) of FIG. 12.

As described above, in the exemplary embodiment, the object moving means 153 calculates the correction amount so as to have a value according to the maximum value of the drag distance during the drag operation. In other words, the object moving means 153 calculates the correction amount so as to maintain the value thereof when the drag distance is decreased during the drag operation. Thus, the correction amount is calculated so as not to decrease the value thereof during the drag operation. As in the case shown in FIG. 12, when the drag distance increases and then decreases, it is considered that the user does not intend to slightly move the object, in contrast to the initial stage of the drag operation. Therefore, in the above case, it is considered that the user is unlikely to feel uncomfortable even when the object is placed at a position shifted from the input coordinates. Therefore, in the exemplary embodiment, by maintaining the distance from the input coordinates to the object in the above case, the object is maintained in the easy-to-view state, whereby operability is improved.

[2-2-3. Determination of Hand Performing Operation]

In the exemplary embodiment, the determination means 154 determines whether the hand of the user performing a drag operation is the right hand or the left hand. The direction of a correction vector (in other words, the direction in which an object is shifted with respect to current coordinates) is changed between the case where the determination result is "right hand" and the case where the determination result is "left hand".

Specifically, in the exemplary embodiment, when the hand performing the drag operation is determined to be the right hand, the object moving means 153 sets a processing mode in an object moving process to a right-hand operation mode. Meanwhile, when the hand performing the drag operation is determined to be the left hand, the object moving means 153 sets the processing mode in the object moving process to a left-hand operation mode.

In the right-hand operation mode, the object moving means 153 sets the direction of the correction vector to an upper left direction. Therefore, in the right-hand operation mode, the object is placed at a position shifted from the current coordinates in the upper left direction as shown in FIG. 9.

Figure 13:
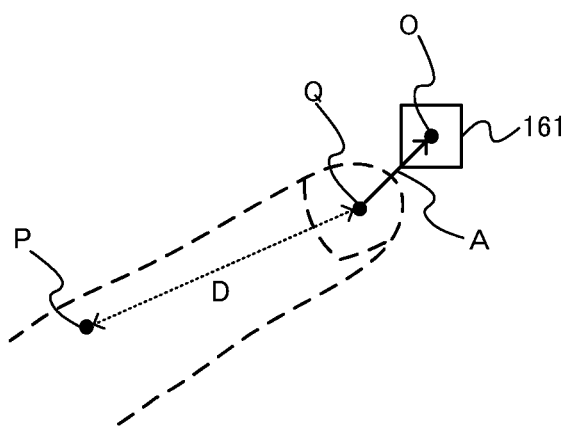
FIG. 13 shows an example of placement of an object in a left-hand operation mode.

FIG. 13 shows an example of object placement in the left-hand operation mode. In the left-hand operation mode, as shown in FIG. 13, the object moving means 153 sets the direction of a correction vector A to an upper right direction. That is, in the above case, the object moving means 153 calculates, as object coordinates O, coordinates obtained by moving current coordinates Q in the upper right direction. Therefore, the object 161 is placed at a position shifted from the current coordinates Q in the upper right direction. The correction direction differs but the correction amount is the same between the right-hand operation mode and the left-hand operation mode.

In the exemplary embodiment, the correction direction is set based on the direction of an image displayed on the display 12. For example, when the image is displayed in the direction in which the display 12 is horizontally long, the up-down direction of the image is the transverse direction of the display 12, and the left-right direction of the image is the longitudinal direction of the display 12. Meanwhile, when the image is displayed in the direction in which the display 12 is vertically long, the up-down direction of the image is the longitudinal direction of the display 12, and the left-right direction of the image is the transverse direction of the display 12.

Determination as to whether the hand of the user performing the drag operation is the right hand or the left hand may be performed by any method. In the exemplary embodiment, the determination means 154 sets, based on a setting instruction from the user, whether the processing mode of the object moving process is the right-hand operation mode or the left-hand operation mode in advance (i.e., before execution of the information processing using the drag operation). In another embodiment, the determination means 154 may perform the above determination automatically (i.e., without a setting instruction from the user). For example, the determination means 154 may perform the above determination, based on the shape of a touched area that is detected during the drag operation. The method of automatically performing the above determination may be a determination method that has conventionally been used.

As described above, when the hand of the user performing the drag operation is determined to be the right hand, the object moving means 153 places the object at a position in the upper left direction with respect to the input coordinates (in other words, the current coordinates) during the drag operation, based on the image displayed on the display 12 (FIG. 9). On the other hand, when the hand of the user performing the drag operation is determined to be the left hand, the object moving means 153 places the object at a position in the upper right direction with respect to the input coordinates during the drag operation, based on the image displayed on the display 12 (FIG. 13). Thus, regardless of whether the drag operation is performed by the left hand or the right hand, the object can be displayed in an easy-to-view manner, whereby operability of the drag operation can be improved.

As described above, in the exemplary embodiment, the object moving means 153 places the object at the position in the obliquely upper direction, in the image displayed on the display 12, with respect to the input coordinates during the drag operation. Thus, the object can be displayed at the position that is unlikely to be hidden behind the finger of the user performing the drag operation, whereby operability of the drag operation can be improved.

In another embodiment, the game system 1 need not perform determination of the hand performing the drag operation (i.e., need not include the determination means 154). In this case, the object moving means 153 may place the object at a position in the upper direction with respect to the current coordinates during the drag operation (specifically, in the direction based on the image displayed on the display 12).

[2-2-4. First Adjustment Process]

As described above, in the exemplary embodiment, the object is displayed at the position shifted in the correction direction from the current coordinates. Therefore, in an end portion of the display region (in other words, near the periphery of the display region), it may be difficult for the user to place an object at a desired position through a drag operation, depending on the situation. For example, assuming that the object is always placed at a position shifted in the upper left direction from the current coordinates, if the current coordinates are located at a right end or a lower end of the display region, the object is placed closer to the center than the right end or the lower end, that is, the object cannot be placed at the right end or the lower end. Therefore, in the exemplary embodiment, when the current coordinates are located in the end portion of the display region, the object moving means 153 executes a first adjustment process of adjusting the correction vector. Hereinafter, the first adjustment process will be described.

In the exemplary embodiment, the "display region" indicates a region, in the display 12, where one image is displayed. For example, in a case where one image (e.g., a game image representing a game space) is displayed over the entire screen of the display 12, the screen region of the display 12 is one display region. Alternatively, for example, in a case where the screen region of the display 12 is divided into two screen regions and different images are displayed in the respective regions (for example, a case where a game image for a first player is displayed in one of the divided screen regions while a game image for a second player is displayed in the other screen region), each of the divided screen regions is one display region. In the exemplary embodiment, the display region is a region in which an image including an object to be subjected to a drag operation is displayed.

In the following description regarding the exemplary embodiment, it is assumed that one image including an object to be subjected to a drag operation is displayed on the entire screen region of the display 12. That is, the entire screen region of the display 12 corresponds to one display region.

Figure 14:
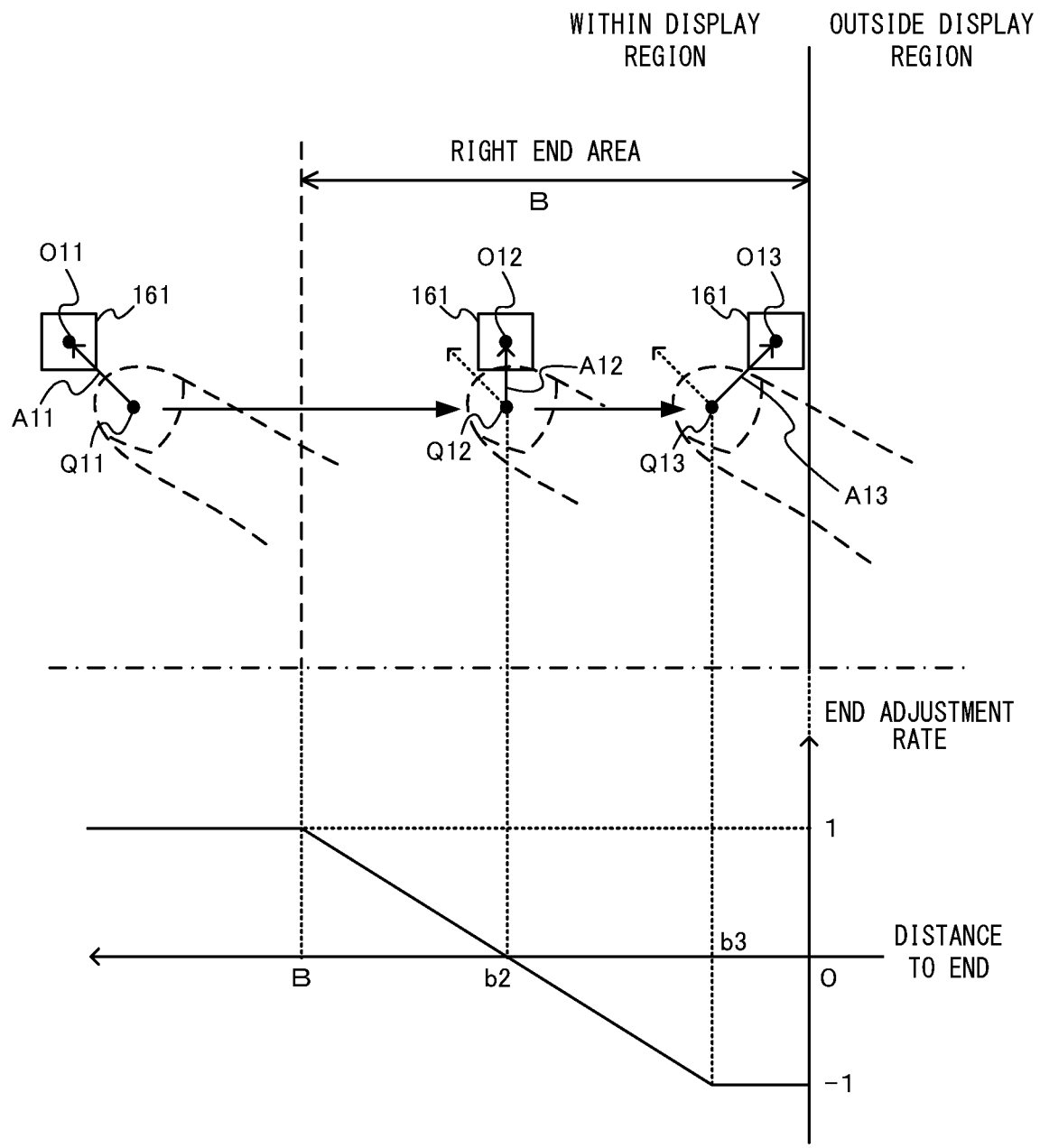
FIG. 14 shows an example of a first adjustment process in a case where current coordinates move to an end portion of a display region.

FIG. 14 shows an example of the first adjustment process in a case where current coordinates move into an end portion of a display region. In FIG. 14, a diagram above an alternate long and short dash line shows how current coordinates of a drag operation move into the end portion of the display region. In the example shown in FIG. 14, it is assumed that the processing mode of the object moving process is set to the right-hand operation mode.

In the exemplary embodiment, an end area is set in the display region. Specifically, an end area is set for each of four sides of the rectangular display 12. More specifically, as shown in FIG. 14, an area having a predetermined distance B from a right end (in other words, right side) of the display region is set as a right end area. Although not shown in FIG. 14, an area having the predetermined distance B from a left side of the display 12 is set as a left end area, an area having the predetermined distance B from an upper side of the display 12 is set as an upper end area, and an area having the predetermined distance B from a lower side of the display 12 is set as a lower end area. In the vicinity of each of four corners of the display 12, two end areas overlap each other.

In FIG. 14, the current coordinates move from coordinates Q11 through coordinates Q12 to coordinates Q13. The coordinates Q11 are at a position outside the right end area. The coordinates Q12 are at a position inside the right end area and separated by a distance b2 from the right end of the display region. The coordinates Q13 are at a position inside the right end area and separated from the right end of the display region by a distance b3 shorter than the distance b2.

Although details will be described below, in the exemplary embodiment, the correction vector is not adjusted in the first adjustment process when the current coordinates are outside the right end area, whereas the correction vector is adjusted in the first adjustment process when the current coordinates are inside the right end area. In this case, as shown in FIG. 14, the object moving means 153 adjusts the correction vector so that the object 161 approaches an end of the display region (more specifically, an end corresponding to the end area). In FIG. 14, the correction vector before being corrected is shown by a dotted line. Hereinafter, a process of adjusting a correction vector in the first adjustment process will be described in detail.

In the exemplary embodiment, as for components of the correction vector, the object moving means 153 adjusts a component in a normal direction relating to the end area where the current coordinates are located, and does not correct a component perpendicular to the normal direction. The "normal direction relating to the end area" is the normal direction at a side, among the sides as the ends of the display region, at which the end area is provided. Specifically, the normal direction relating to the right end area or the left end area is the left-right direction, and the normal direction relating to the upper end area or the lower end area is the up-down direction. In the example shown in FIG. 14, since the current coordinates are located in the right end area, a component of the correction vector in the left-right direction is adjusted while a component of the correction vector in the up-down direction is not adjusted.

In the exemplary embodiment, the object moving means 153 adjusts the component of the correction vector in the normal direction by using an end adjustment rate. Specifically, the end adjustment rate is calculated based on the distance from the current coordinates to an end of the display region.

In FIG. 14, a graph beneath the alternate long and short dash line shows an example of a relation between the end adjustment rate and the distance from the current coordinates to the right end of the display region. As shown in FIG. 14, when the distance from the current coordinates to the right end of the display region is B or larger (i.e., when the current coordinates are outside the right end area), the end adjustment rate is calculated to be 1. When the distance from the current coordinates to the right end of the display region is smaller than B (i.e., when the current coordinates are inside the right end area), the end adjustment rate is calculated to be smaller than 1. Specifically, the end adjustment rate is calculated to be decreased with decrease in the distance. In the exemplary embodiment, the end adjustment rate is calculated to be 0 when the distance is b2 (refer to FIG. 14). The end adjustment rate is calculated to be a lower-limit value (−1) when the distance is smaller than b3.

FIG. 14 shows an example in which the distance is proportional to the end adjustment rate (in a period during which the end adjustment rate is decreased with decrease in the distance). However, a function indicating the relation between the distance and the end adjustment rate is not limited to a proportional function, and may be any function that causes the end adjustment rate to be gradually decreased with decrease in the distance. As in the exemplary embodiment, since the likelihood of a sudden change of the position of the object during the drag operation can be reduced by causing the end adjustment rate to continuously change according to the distance, operability of the drag operation can be improved.

In the example shown in FIG. 14, when the current coordinates are the coordinates Q11 outside the right end area, the end adjustment rate is 1. In this case, in the first adjustment process, the object moving means 153 multiplies the component of the correction vector in the normal direction (specifically, the left-right direction) by 1, and therefore, the value of the correction vector does not change. That is, in the above case, the object moving means 153 does not substantially adjust the correction vector. As a result, as described above, the object 161 is displayed at the position of the object coordinates O11 obtained by correcting the current coordinates Q11 in the upper left direction (see FIG. 14).

When the current coordinates are located in the right end area, the object moving means 153 multiplies the component of the correction vector in the normal direction by the end adjustment rate which is smaller than 1. Therefore, a component, of the correction vector, directed leftward is adjusted to be decreased. That is, the correction vector is corrected such that the direction thereof is approximated to the direction from the object 161 to the right end of the display region (i.e., the rightward direction). Therefore, the object coordinates, in the case where the first adjustment process is executed, are located closer to the right end of the display region than the object coordinates in the case where the first adjustment process is not executed.

For example, when the current coordinates are the coordinates Q12 having the distance b2 to the right end, the end adjustment rate is 0. In this case, since the component of the correction vector in the normal direction (i.e., the left-right direction) is 0, the adjusted correction vector A12 is directed upward. Therefore, the object coordinates O12 are located at a position shifted upward from the current coordinates Q12, and the object 161 is displayed at this position (see FIG. 14).

For example, when the current coordinates are the coordinates Q13 having the distance b3 to the right end, the end adjustment rate is a negative value (−1). In this case, since the component of the correction vector in the normal direction (i.e., the left-right direction) is directed rightward, the adjusted correction vector A13 is directed in the upper right direction. Therefore, the object coordinates O13 are located at a position shifted from the current coordinates Q13 in the upper right direction, and the object 161 is displayed at this position (see FIG. 14).

In the above description, the case where the current coordinates are located in the right end area in the display region has been described as an example. However, the same applies to a case where the current coordinates are located in an end area other than the right end area. That is, when the current coordinates are located in the left end area, the correction vector is adjusted so that the object approaches the left end of the display region (in other words, so that the correction direction is approximated to the leftward direction). When the current coordinates are located in the upper end area, the correction vector is adjusted so that the object approaches the upper end of the display region. When the current coordinates are located in the lower end area, the correction vector is adjusted so that the object approaches the lower end of the display region. In the right-hand operation mode, the correction vector is directed in the upper left direction. Therefore, when the current coordinates are located in the left end area or when the current coordinates are located in the upper end area, the correction vector is adjusted so that the magnitude thereof is increased with the direction thereof being not inverted. Specifically, in the above case, the end adjustment rate is set to a value larger than 1, for example, within a range from 1 to 2. In this case, the correction vector is adjusted within a range from 1 time to 2 times.

When the current coordinates are located in an area where two end areas overlap each other, correction vectors are adjusted with respect to the normal directions relating to the respective end areas. For example, when the current coordinates are located near the lower right corner of the display region (i.e., located in the right end area and in the lower end area), the correction vectors are adjusted so that the object approaches the right end and the lower end of the display region (in other words, so that the correction direction is approximated to the lower right direction).

As described above, in the exemplary embodiment, at least on the condition that the input coordinates during the drag operation (specifically, the current coordinates) are at a position within a predetermined distance from an end of the display region in the display 12, the object moving means 153 adjusts the correction vector so that the position of the object based on the correction direction approaches this end. As for the correction vector, at least one of the correction direction and the correction amount may be adjusted. This allows the user to easily place the object at the end of the display region during the drag operation, whereby operability of the drag operation can be improved. For example, in a case where the correction direction before being adjusted is the upper left direction, if the input coordinates are located in the right end area of the display region, the correction direction is adjusted so that the object approaches the right end (FIG. 14). This allows the user to easily place the object at the right end. Meanwhile, for example, in a case where the correction direction before being adjusted is the upper left direction, if the input coordinates are located in the left end area in the display region, the correction direction is adjusted so that the object approaches the left end. This allows the user to place the object at the left without moving the input coordinates to the left end.

In the exemplary embodiment, the object moving means 153 adjusts the correction direction, at least on the condition that the input coordinates during the drag operation (specifically, the current coordinates) are located in an end area in the first adjustment process. In another embodiment, the object moving means 153 may use the object coordinates instead of the input coordinates in the first adjustment process. That is, the object moving means 153 may adjust the correction direction, on the condition that the object coordinates are located in an end area in the first adjustment process.

In the exemplary embodiment, in a case where the input coordinates during the drag operation is within a predetermined distance from an end of the display region and where the correction direction before being adjusted (e.g., the direction of the correction vector indicated by the dotted line in FIG. 14) is opposite to the direction (rightward direction in FIG. 14) from the input coordinates to the end of the display region (e.g., in a case where, in FIG. 14, the correction vector before being adjusted is directed in the upper left direction and the current coordinates are coordinates Q12 or Q13 at which the end of the display region is on the right side with respect to the current coordinates), the object moving means 153 adjusts the correction direction so that the object based on the correction direction approaches the end. Thus, as described above, the user can easily place the object at the end on the opposite side to the correction direction before being adjusted (e.g., the right end or the lower end when the correction direction before being adjusted is the upper left direction). The "correction direction being opposite to the direction from the input coordinates to the end of the display region" means that an angle θ formed by the correction vector and the direction from the input coordinates to the end of the display region satisfies 90°<θ<270°.

In another embodiment, an end area need not be set at all the sides of the display region. For example, in another embodiment, the object moving means 153 may set a right end area and a lower end area in the right-hand operation mode, and may set a left end area and a lower end area in the left-hand operation mode. Thus, as in the exemplary embodiment, the user can easily place the object at an end on the opposite side to the correction direction. In another embodiment, the width of an end area set in the display region (e.g., the predetermined distance B described above) may vary from end area to end area. For example, the right end area may be set within a range up to a distance B1 from the right side of the display 12, and the upper end area may be set within a range up to a distance B2 from the upper side of the display 12 (note that the distance B2 is different in length from the distance B1).

In the exemplary embodiment, in the first adjustment process, the component of the correction vector in the normal direction is adjusted. However, in another embodiment, components of the correction vector in two directions (i.e., a component in the normal direction and a component perpendicular to the normal direction) may be adjusted. For example, the object moving means 153 may adjust the correction vector by multiplying the correction vector by the end adjustment rate. Specifically, the object moving means 153 may adjust the correction vector so as to decrease the magnitude thereof (i.e., the correction amount). At this time, the lower-limit value of the end adjustment rate is 0 or more. Thus, the closer the current coordinates approach an end of the display region, the closer to the current coordinates the object is placed. Also in this case, as in the exemplary embodiment, the user can place the object at the end of the display region through the drag operation.

In the exemplary embodiment, the first adjustment process is executed when the input coordinates of the drag operation are changed from a position outside the end area to a position inside the end area. Therefore, in a case where the start coordinates of the drag operation are at a position inside the end area, if the input coordinates of the drag operation remain at the position inside the end area without going out of the end area, the first adjustment process is not executed. In the exemplary embodiment, a second adjustment process described below is executed in the above case.

In another embodiment, the first adjustment process may be executed in any case where the current coordinates of the drag operation are at a position inside the end area, not limited to the case where the input coordinates are changed from a position outside the end area to a position inside the end area. That is, in the case where the start coordinates of the drag operation are at a position inside the end area, even if the input coordinates of the drag operation remain at the position inside the end area without going out of the end area, the object moving means 153 may execute the first adjustment process. In this case, the second adjustment process described below is not executed.

[2-2-5. Second Adjustment Process]

The user may perform a drag operation along a side of the display region in the vicinity of an end of the display region. In such a case, it is assumed that the user intends to move an object along the side of the display region by the drag operation. Therefore, in the above case, if the object is subjected to correction using the correction vector and moved in a direction different from the direction along the side, the user may feel uncomfortable with the drag operation. Therefore, in the exemplary embodiment, in the above case, the object moving means 153 executes a second adjustment process of adjusting the correction vector so that the object is placed in the direction along the side from the current coordinates. Hereinafter, the second adjustment process will be described in detail.

Figure 15:
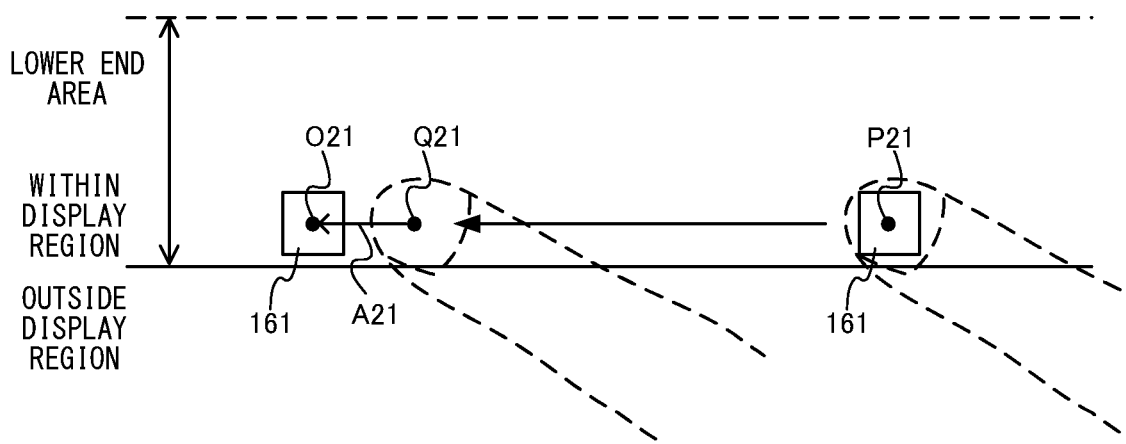
FIG. 15 shows an example of how an object is moved by a drag operation in an end area.

FIG. 15 shows an example of how an object is moved by a drag operation in an end area. Specifically, FIG. 15 shows how a drag operation on an object 161 is performed in a lower end area. In the example shown in FIG. 15, the drag operation has been performed from coordinates P21 in the lower end area to coordinates Q21 through the lower end area. In the example shown in FIG. 15, the processing mode in the object moving process is set to the right-hand operation mode.

In FIG. 15, the object moving means 153 adjusts the correction vector so that no correction is performed for the normal direction (i.e., the up-down direction) relating to the lower end area. Specifically, in the second adjustment process, the object moving means 153 performs adjustment to set the component of the correction vector in the normal direction to 0. Thus, object coordinates O21 are calculated based on a correction vector A21 that is directed leftward from the current coordinates Q21, and the object 161 is displayed at the position of the object coordinates O21 (see FIG. 15).

In a case where the input coordinates of the drag operation, which has been started from the start coordinates in the end area, are located outside the end area, the object moving means 153 ends execution of the second adjustment process, because, in this case, it is assumed that the user does not intend to move the object along the side of the display region. In a case where the input coordinates, which have been located outside the end area, again enter the end area, the first adjustment process is executed.

In a case where the first adjustment process is executed after execution of the second adjustment process has been ended, the object moving means 153 calculates a correction amount regarding the normal direction (i.e., the magnitude of the component of the correction vector in the normal direction), based on the change amount from the end of execution of the second adjustment process. That is, the correction amount regarding the normal direction is calculated based on a distance from the input coordinates at the end of execution of the second adjustment process to the current coordinates. Thus, it is possible to reduce the likelihood of a sudden change of the position of the object after the end of execution of the second adjustment process, whereby operability of the drag operation can be improved. In another embodiment, in the above case, the object moving means 153 may calculate the correction amount regarding the normal direction, based on the change amount from the start of the drag operation.

The case where the start coordinates are located in the lower end area in the display region has been described as an example. However, the same applied to a case where the start coordinates are located in an end area other than the lower end area. That is, when a drag operation is performed in the upper end area, the object is placed at a position shifted only in the left-right direction from the current coordinates, as in the case where a drag operation is performed in the lower end area. When a drag operation is performed in the right end area or the left end area, the object is placed at a position shifted only in the up-down direction from the current coordinates. In the exemplary embodiment, since the correction vector before being adjust is directed in the upper left direction or the upper right direction, when the drag operation is performed in the right end area or the left end area, the object is placed at a position shifted directly upward through the second adjustment process. Therefore, also in the case where the second adjustment process is executed, the position of the object is unlikely to be hidden behind a finger of the user performing the drag operation and therefore is easily viewed, as in the case where the second adjustment process is not executed.

The case where the processing mode in the object moving process is set to the right-hand operation mode has been described as an example. When the processing mode is set to the left-hand operation mode, a second adjustment process similar to that in the right-hand operation mode is executed (although the correction direction is different from that in the right-hand operation mode). That is, also in the left-hand operation mode, when a drag operation is started and continued in an end area, the object moving means 153 performs adjustment in which a component, of the correction vector, in the normal direction relating to the end area is set to 0.

As described above, in the exemplary embodiment, while the respective input coordinates from start of the drag operation are within the range of the end area, the object moving means 153 places the object at the object coordinates obtained by correcting the input coordinates during the drag operation (specifically, the current coordinates) into the direction perpendicular to the normal direction relating to the end area (i.e., the input coordinates are not corrected with respect to the normal direction). Thus, it is possible to reduce the likelihood that the object moves in a direction different from the intention of the user performing the drag operation, whereby operability of the drag operation can be improved.

In another embodiment, the object moving means 153 may perform determination whether or not to perform adjustment in the second adjustment process, by using the coordinates of the object (e.g., coordinates indicating the center of the object) instead of the input coordinates. That is, in the another embodiment, while the coordinates of the object are within the range of the end area, the object moving means 153 may place the object at object coordinates obtained by correcting the input coordinates during the drag operation (specifically, the current coordinates) into the direction perpendicular to the normal direction relating to the end area.

In another embodiment, the object moving means 153 may adjust the correction vector to be 0 in the second adjustment process. At this time, since correction by use of the correction vector is not performed, the object is placed at the position of the current coordinates. Thus, while the respective input coordinates from start of the drag operation are in the range of the end area, the object moving means 153 may place the object at the position of the input coordinates during the drag operation (specifically, the current coordinates). Also in this case, as in the exemplary embodiment, it is possible to reduce the likelihood that the object moves in a direction different from the intention of the user performing the drag operation.

The end areas used in the first adjustment process may be the same as or different from those used in the second adjustment process. For example, the widths of the end areas used in the first adjustment process may be the same as or different from those used in the second adjustment process. Further, for example, while four end areas, i.e., the upper, lower, left, and right end areas, are used in the first adjustment process, only the lower end area may be used in the second adjustment process.

[2-2-6. Third Adjustment Process]

In the exemplary embodiment, an appropriate correction amount may differ depending on where the start coordinates of a drag operation are located in an object as an operation target. For example, in the right-hand operation mode described above, the object is placed at a position shifted from the current coordinates in the upper left direction. At this time, a correction amount, which is necessary for shifting the object from the current coordinates so as not to be hidden behind a finger performing the drag operation, differs between a case where the start coordinates are at a position in an upper left portion of the object and a case where the start coordinates are at a position in a lower right portion of the object. Therefore, in the exemplary embodiment, the object moving means 153 executes a third adjustment process of adjusting the correction vector, based on the position of the start coordinates in the object (in other words, based on the positional relation between the object and the start coordinates). Hereinafter, the third adjustment process will be described in detail.

Figure 16:
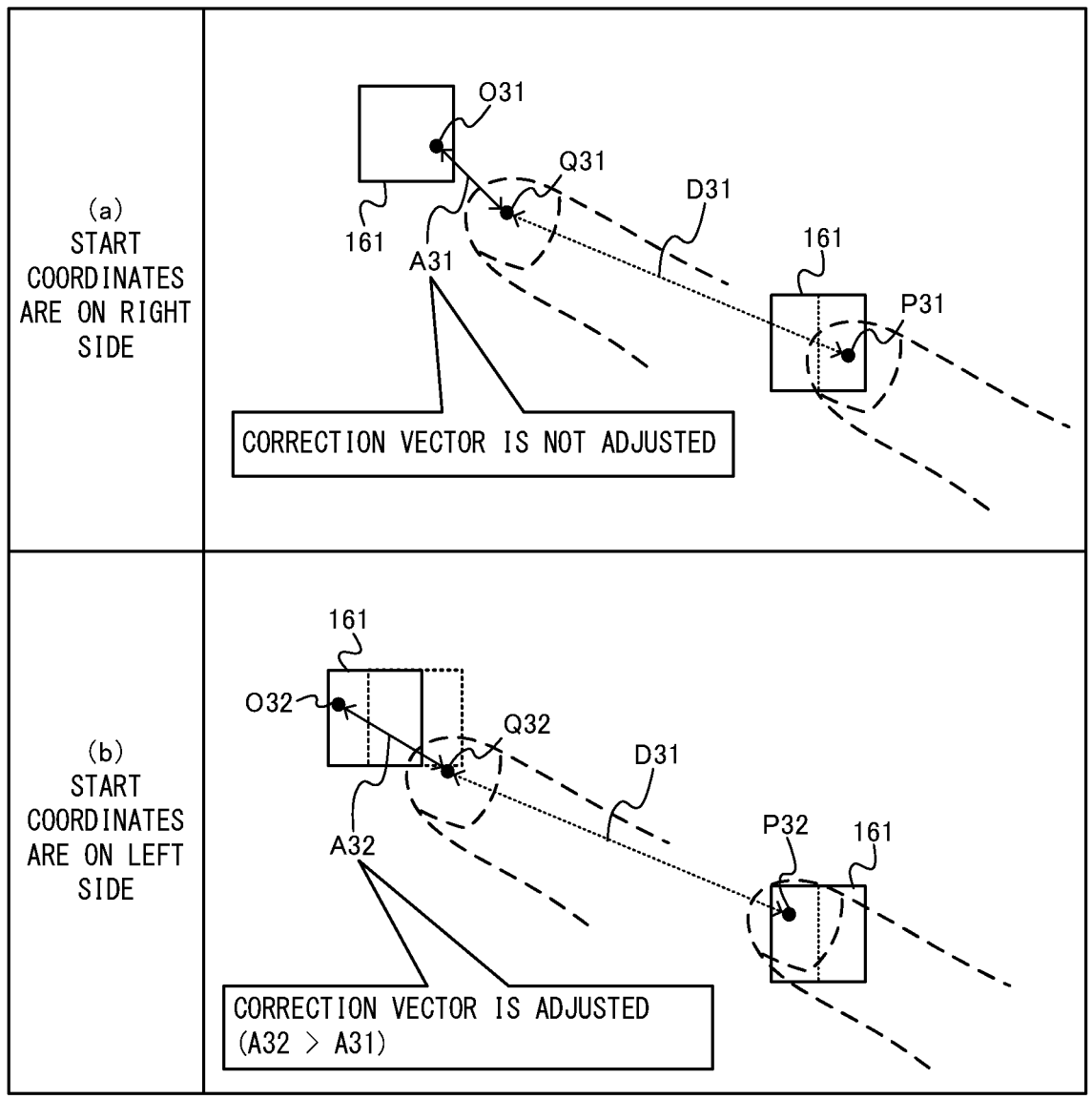
FIG. 16 shows examples of how an object moves in two cases with different start coordinates.

FIG. 16 shows examples of how an object moves in the two cases with different start coordinates. In the example shown in FIG. 16, it is assumed that the processing mode of the object moving process is set to the right-hand operation mode.

In FIG. 16, (a) shows how the object 161 moves in a case where coordinates P31 on the right side relative to the center of the object 161 (more specifically, on the right side relative to the axis, in the up-down direction, that crosses the center) are start coordinates. In the exemplary embodiment, when the start coordinates are on the right side relative to the center of the object 161, adjustment of the correction vector by the third adjustment process is not performed. Therefore, in this case, as for current coordinates Q31 separated by a drag distance D31 from the start coordinates P31, a correction vector A31 which is not adjusted by the third adjustment process is used. That is, object coordinates O31 are calculated based on the correction vector A31 directed in the upper left direction from the current coordinates Q31, and the object 161 is displayed at the position of the object coordinates O31 (see (a) of FIG. 16).

Meanwhile, in FIG. 16, (b) shows how the object 161 moves in a case where coordinates P32 on the left side relative to the center of the object 161 (more specifically, on the left side relative to the axis, in the up-down direction, that crosses the center) are start coordinates. In the exemplary embodiment, when the start coordinates are on the left side relative to the center of the object 161, adjustment of the correction vector by the third adjustment process is performed. Specifically, in this case, the object moving means 153 adjusts the correction vector so as to increase a component thereof in the leftward direction. Therefore, in this case, as for current coordinates Q32 separated by a drag distance D31 (i.e., the same drag distance as that shown in (a) of FIG. 16) from the start coordinates P32, correction vector A32 adjusted by the third adjustment process is used. Although details will be described below, the correction vector A32 is a vector in which a component in the leftward direction is increased as compared to the correction vector A31. Therefore, object coordinates O32 are calculated based on the correction vector A32 that is directed in the upper left direction from the current coordinates Q32 and is larger than the correction vector A31, and the object 161 is displayed at the position of the object coordinates O32 (see (b) of FIG. 16). In (b) of FIG. 16, the object 161, which is placed at the position calculated by using the correction vector A31 that is not adjusted by the third adjustment process, is shown by a dotted line. As is clear from FIG. 16, through the third adjustment process, the object becomes less likely to be hidden behind the finger, and is placed at a more easily visible position.

The adjustment in the third adjustment process is performed by multiplying the component of the correction vector in the left-right direction by a start adjustment rate. In the exemplary embodiment, the start adjustment rate is calculated based on the position of the start coordinates within the object (more specifically, a distance from the center of the object to the start coordinates in the left-right direction).

Figure 17:
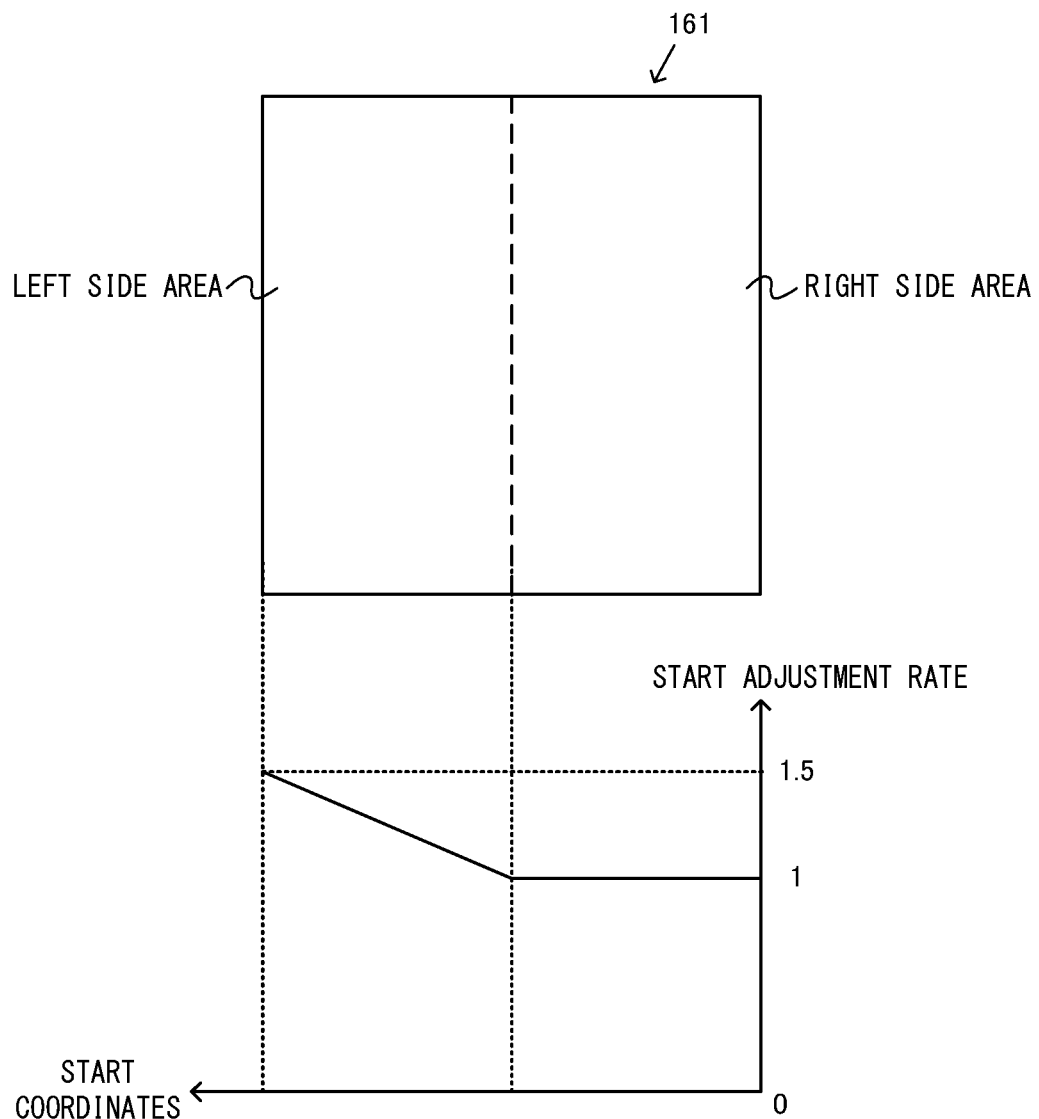
FIG. 17 shows an example of a relation between a start adjustment rate and the position of start coordinates in a left-right direction.

FIG. 17 shows an example of a relation between the start adjustment rate and the position of the start coordinates in the left-right direction. As shown in FIG. 17, when the start coordinates are in the area on the right side relative to the center of the object, the start adjustment rate is set to 1. Therefore, in this case, adjustment by the third adjustment process is not substantially performed. On the other hand, when the start coordinates are in the area on the left side relative to the center of the object, the start adjustment rate is set to a value equal to or larger than 1. Specifically, as shown in FIG. 17, in the above case, the start adjustment rate increases in proportion to the distance from the center of the object to the start coordinates (the distance in the left-right direction), and reaches an upper-limit value (here, 1.5) when the start coordinates are at the left end of the object.

In the exemplary embodiment, the closer to the left side in the object the start coordinates are located, the larger the start adjustment rate is. Therefore, the closer to the left side in the object the start coordinates are located, the farther from the current coordinates the object is placed. Thus, the object is unlikely to be hidden behind the finger performing the drag operation.

The case where the processing mode in the object moving process is set to the right-hand operation mode has been described as an example. When the processing mode is set to the left-hand operation mode, the object moving means 153 executes the third adjustment process with the relation between the position of the start coordinates and the start adjustment rate (FIG. 17) being inverted with respect to left and right. That is, in the left-hand operation mode, when the start coordinates are in the area on the left side relative to the center of the object, the start adjustment rate is set to 1, and adjustment is not substantially performed. When the start coordinates are in the area on the right side relative to the center of the object, the start adjustment rate is calculated so as to increase in proportion to the distance from the center of the object to the start coordinates (distance in the left-right direction). In the case where the processing mode is set to the left-hand operation mode, when the start adjustment rate is a value equal to or larger than 1, the object moving means 153 adjusts the correction vector so as to increase a component thereof in the rightward direction.

As described above, in the exemplary embodiment, in the case where the start coordinates are on the side (i.e., the left side) of the correction direction with respect to a predetermined axis passing a reference position (here, the center) of the object, the object moving means 153 sets the correction amount during the drag operation to be larger on the side of the correction direction, as compared to the case where the start coordinates are on the side (e.g., the right side) opposite in the correction direction with respect to the predetermined axis. Thus, the correction amount can be controlled according to the position of the start coordinates in the object, whereby the object can be placed at an easily visible position. This improves operability of the drag operation.

In the exemplary embodiment, the reference position is set to the position of the center of the object, and the correction amount is varied between the case where the start coordinates are on the right side relative to the center and the case where the start coordinates are on the left side relative to the center. In another embodiment, the reference position may be set to any position in the object.

In the exemplary embodiment, the predetermined axis is parallel to the up-down direction. In another embodiment, the predetermined axis may be parallel to the left-right direction. That is, in the exemplary embodiment, the object moving means 153 changes the correction amount relating to the left-right direction, based on the position of the start coordinates in the left-right direction. However, in the another embodiment, the object moving means 153 may change the correction amount relating to the up-down direction, based on the position of the start coordinates in the up-down direction. For example, the object moving means 153 may set the correction amount to be larger in the case where the start coordinates are on the upper side relative to the center of the object than in the case where the start coordinates are on the lower side relative to the center of the object. In another embodiment, the predetermined axis may be parallel to an oblique direction, and the correction amount may be changed while considering both the position of the start coordinates in the left-right direction and the position of the start coordinates in the up-down direction. For example, the object moving means 153 may set the correction amount to be larger in the case where the start coordinates are on the upper left side relative to the center of the object than in the case where the start coordinates are on the lower right side relative to the center of the object.

In the exemplary embodiment, the object moving means 153 adjusts the component of the correction vector in the left-right direction in the third adjustment process. In another embodiment, in the third adjustment process, the components of the correction vector in two directions (i.e., the component in the normal direction and the component perpendicular to the normal direction) may be adjusted. Specifically, the object moving means 153 may adjust the correction vector by multiplying the correction vector by the start adjustment rate described above. In this case, before and after the adjustment, the correction direction is not changed but the correction amount is changed.

[2-2-7. Process Performed when No Input Coordinates are Acquired During Drag Operation]

In the exemplary embodiment, in a case where acquisition (in other words, detection) of input coordinates was interrupted for some reasons during the drag operation and thereafter input coordinates have been acquired again, the game system 1 determines, under a predetermined condition, that the drag operation is continued. Thus, the likelihood that the drag operation is ended against the user's intention is reduced. Hereinafter, the process of continuing the drag operation will be described.

Figure 18:
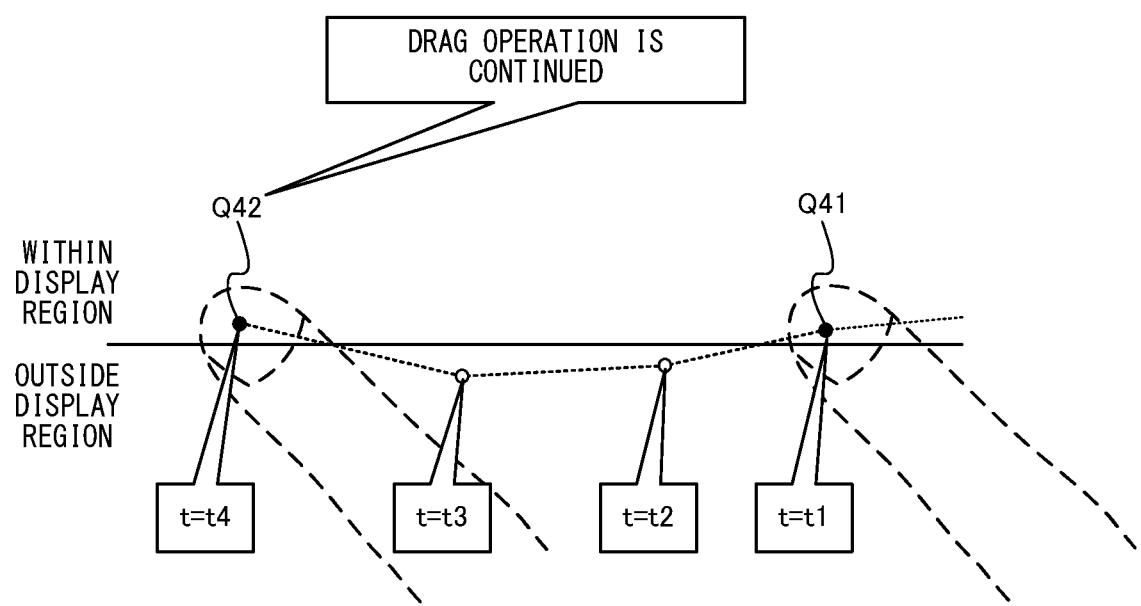
FIG. 18 shows an example of how a drag operation is performed in the vicinity of an end portion of a display region.

FIG. 18 shows an example of how a drag operation is performed in the vicinity of an end portion of the display region. FIG. 18 shows an input trajectory caused by a drag operation performed during a period of time t=t1 to t4. In FIG. 18, input coordinates Q41 are acquired at time t1. At time t2 and time t3, no input coordinates are acquired because the positions of input performed by the user (the positions represented by white dots in FIG. 18) are outside the display region. At time t4, input coordinates Q42 are acquired.

In the exemplary embodiment, the change amount calculation means 152 measures the elapsed time from when input coordinates have become not to be acquired during the drag operation. When input coordinates are acquired again, the change amount calculation means 152 determines whether or not the elapsed time is shorter than a predetermined continuation determination period. The continuation determination period may have any length. For example, the continuation determination period is set to a length corresponding to a period during which object coordinates are updated ten times based on input coordinates (in other words, ten frame period).

When the elapsed time is shorter than the continuation determination period, the change amount calculation means 152 determines that the drag operation is continued. That is, the change amount calculation means 152 calculates a drag distance, based on the start coordinates in the drag operation before acquisition of input coordinates was interrupted and on the input coordinates that have been acquired after the interruption. Thus, when the elapsed time is shorter than the continuation determination period, the drag distance is continuously calculated for the drag operation before acquisition of the input coordinates was interrupted. In this case, the object is displayed at the position of the object coordinates based on the calculated drag distance. In the example shown in FIG. 18, assuming that the elapsed time is shorter than the continuation determination period, the object is displayed at the position based on the input coordinates Q41, and thereafter, the object is displayed at the position based on the input coordinates Q42. Thus, the user can continue the drag operation.

On the other hand, when the elapsed time is equal to or longer than the continuation determination period, the change amount calculation means 152 determines that the drag operation has ended, and ends movement of the object. In this case, the object stops its movement at the time point when input coordinates have become not to be acquired during the drag operation. In the example shown in FIG. 18, assuming that the elapsed time is equal to or longer than the continuation determination period, the object displayed at the position based on the input coordinates Q41 is not moved even when input coordinates Q42 are acquired.

FIG. 18 shows, as an example, the case where no input coordinates are acquired because the position of input performed by the user is outside the display region. However, input coordinates may become not to be acquired for any reasons. In the exemplary embodiment, regardless of the reason why input coordinates are not acquired, the change amount calculation means 152 determines that the drag operation is continued when the elapsed time is shorter than the continuation determination period.

As described above, in the exemplary embodiment, in a case where input coordinates of a drag operation are acquired again within a predetermined time period (specifically, the continuation determination period) from when input coordinates of the drag operation have become not to be acquired, the change amount calculation means 152 continuously calculates the change amount with respect to the drag operation. Thus, even when input coordinates temporarily become not to be acquired for some reasons, the user can continue the drag operation, whereby operability of the drag operation can be improved.

[3. Specific Example of Processing in Game System]

Next, a specific example of an object moving process to be executed in the game system 1 will be described with reference to FIGS. 19 to 21.

[3-1. Data Used for the Process]

FIG. 19 shows examples of various types of information used for the object moving process in the game system 1. The various types of information shown in FIG. 19 are stored in a storage medium (e.g., the flash memory 84, the DRAM 85, and/or the memory card attached to the slot 23) accessible by the main body apparatus 2.

As shown in FIG. 19, the game system 1 stores an information processing program therein. The information processing program is a program (e.g., an application program such as a game program) for executing the object moving process of the exemplary embodiment, and is stored in, for example, the flash memory 84 and/or the memory card attached to the slot 23.

As shown in FIG. 19, the game system 1 stores therein drag operation information, change amount information, operation hand information, correction vector information, and object information. These pieces of information (in other words, data) are generated and used in the object moving process described below (FIGS. 20 and 21).

The drag operation information indicates input coordinates during a drag operation. In the exemplary embodiment, the drag operation information includes at least input coordinate information indicating start coordinates, input coordinate information indicating current coordinates, and input coordinate information indicating input coordinates that have been acquired immediately before the current coordinates.

The change amount information indicates the aforementioned change amount. As described above, in the exemplary embodiment, the change amount information indicates the aforementioned drag distance. The operation hand information indicates whether the hand of the user performing the drag operation is the right hand or the left hand, as described above. The correction vector information indicates a correction vector calculated during the drag operation.

The object information relates to an object placed in a virtual space displayed on the display 12. In the exemplary embodiment, the object information includes information indicating the aforementioned object coordinates. The object information is generated and stored for each of objects placed in the virtual space.

[3-2. Processing Executed in Game System]

Figure 20:
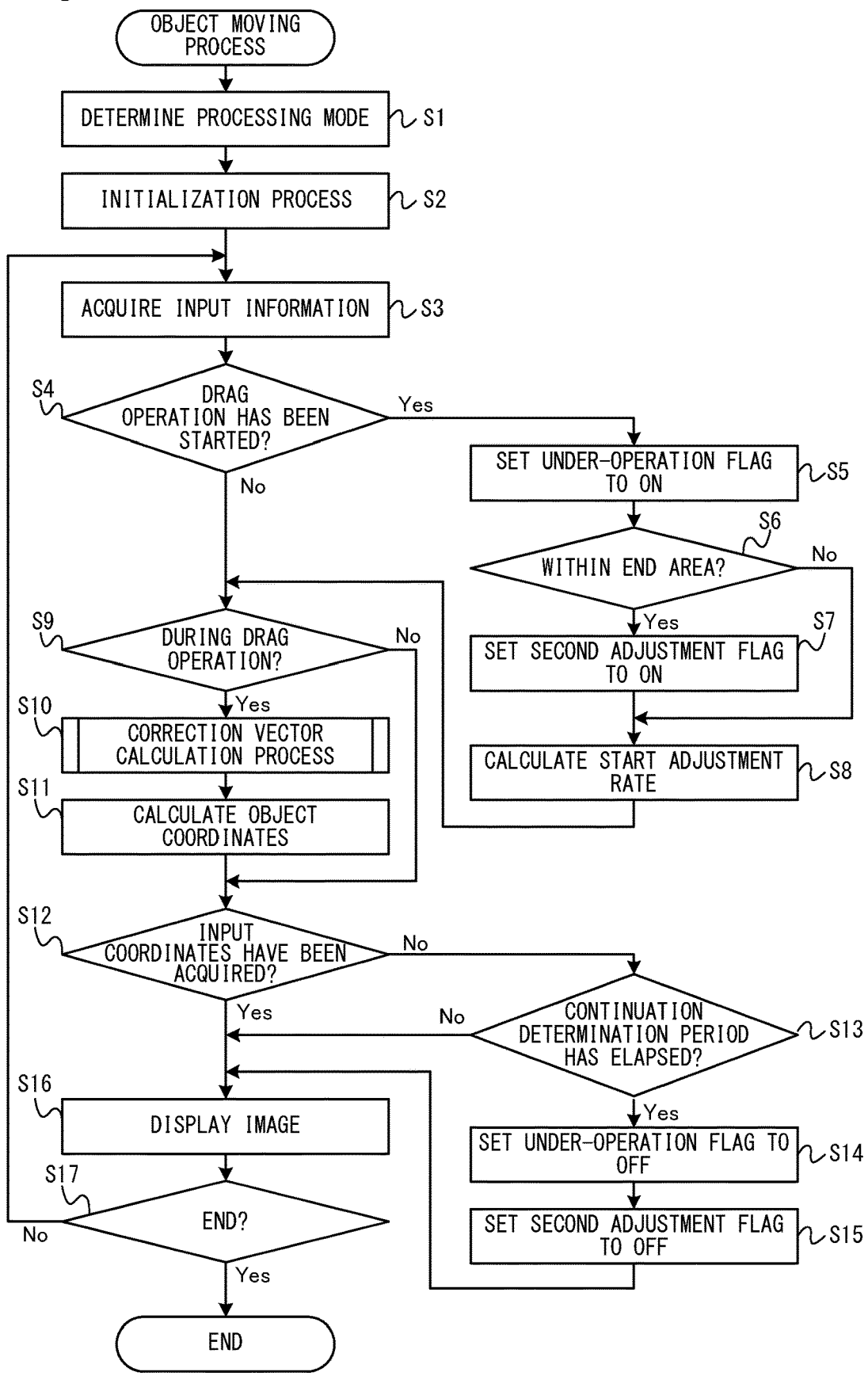
FIG. 20 is a flowchart showing an example of a flow of the object moving process executed by the non-limiting game system.
Figure 21:
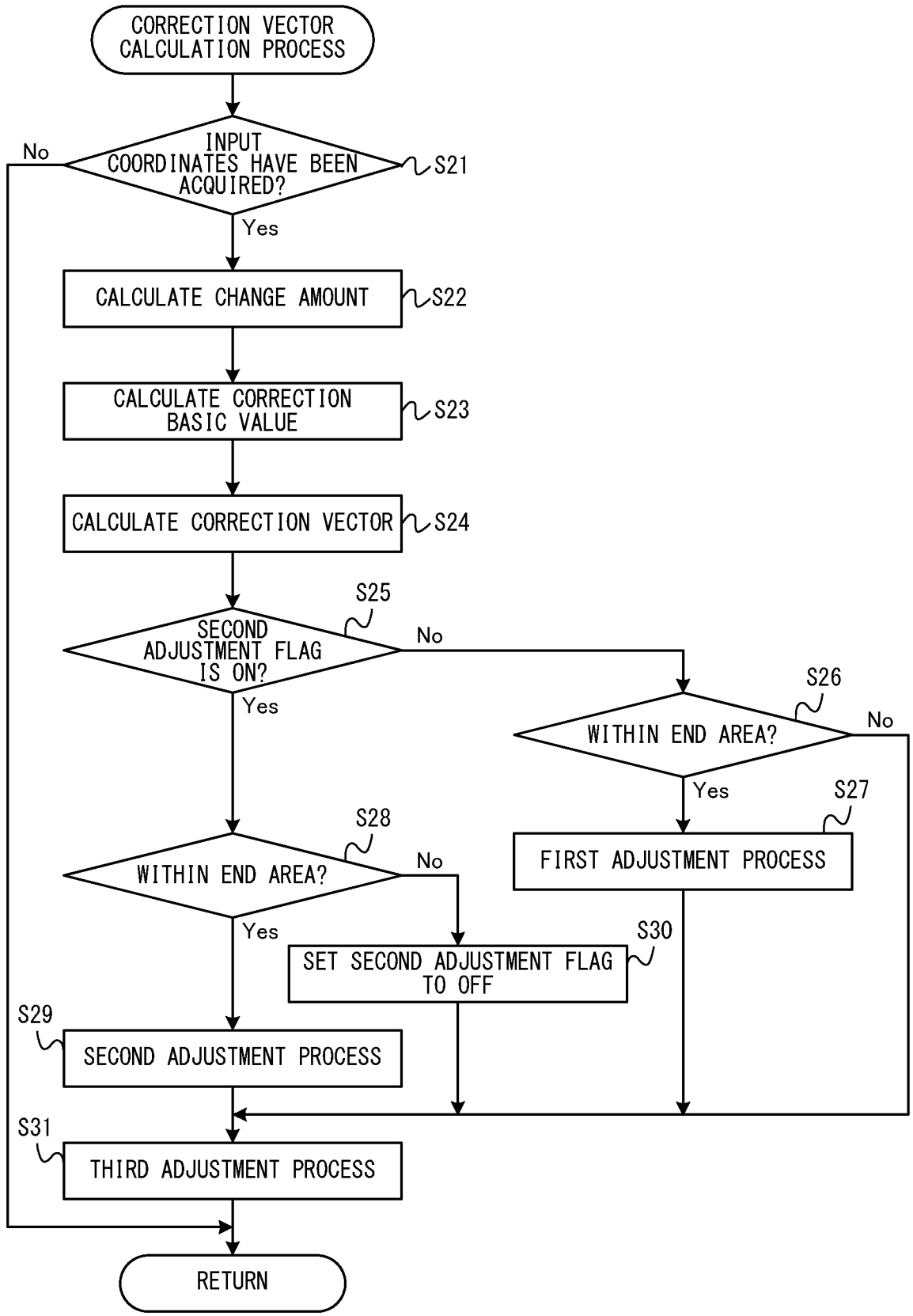
FIG. 21 is a flowchart showing an example of a specific flow of a correction vector calculation process in step S10 shown in FIG. 20.

FIGS. 20 and 21 are flowcharts showing an example of a flow of an object moving process executed by the game system 1. The sequential object moving process shown in FIGS. 20 and 21 is started at an appropriate timing after the information processing program has been started up by the processor 81. For example, execution of the object moving process is started when a virtual space, in which an object that can be subjected to drag operation is placed, is displayed on the display 12.

In the exemplary embodiment, the processor 81 of the main body apparatus 2 executes the information processing program stored in the game system 1, thereby executing processes in steps shown in FIGS. 20 and 21. However, in another embodiment, some of the processes in the steps may be executed by a processor (e.g., a dedicated circuit) other than the processor 81. When the game system 1 is communicable with another information processing apparatus (e.g., a server), some of the processes in the steps shown in FIGS. 20 and 21 may be executed by the another information processing apparatus. The processes in the steps shown in FIGS. 20 and 21 are merely examples, and as long as the same result is obtained, the order of the processes in the respective steps may be changed, or another process may be executed in addition to (or instead of) the process in each step.

The processor 81 executes the processes in the steps shown in FIGS. 20 and 21 by using a memory (e.g., the DRAM 85). That is, the processor 81 stores information (in other words, data) obtained in the respective process steps in the memory. When the information is used in the subsequent process steps, the processor 81 reads out the information from the memory and uses the information.

In step S1 shown in FIG. 21, the processor 81 (in other words, the determination means 154) determines whether the processing mode is the right-hand operation mode or the left-hand operation mode. The process in step S1 is a process for determining whether the hand of the user performing a drag operation is the right hand or the left hand. In the exemplary embodiment, as described above in "[2-2-3. Determination of hand performing operation]", the processor 81, based on a setting instruction from the user, determines whether the processing mode is the right-hand operation mode or the left-hand operation mode. At this time, the processor 81 stores, in the memory, operation hand information indicating the determination result. Next to step S1, the process in step S2 is executed.

In step S2, the processor 81 executes an initialization process. In the initialization process, the processor 81 sets initial values of various types of information to be used in the following processes (i.e., the series of processes in steps S3 to S17). For example, in the exemplary embodiment, an under-operation flag described below is set to OFF and a second adjustment flag described below is set to OFF. Further, in the initialization process, the processor 81 sets setting information to be used for a predetermined process, according to the result of the determination in step S1 (i.e., the right-hand operation mode or the left-hand operation mode). Specifically, a correction direction of a correction vector is set according to the determination result in step S1 (see the above-described "[2-2-3. Determination of hand performing operation]"). Further, a method for calculating a start adjustment rate in the third adjustment process and a direction of adjusting a correction vector in the third adjustment process, are set according to the determination result in step S1 (see the above-described "[2-2-6. Third adjustment process]"). Next to step S2, the process in step S3 is executed.

In step S3, the processor 81 (in other words, the input coordinate acquisition means 151) acquires input information indicating an input to the touch panel. That is, the processor 81 acquires, from the touch panel 13, the input information indicating the input performed on the touch panel 13. When a touch input of the user to the touch panel 13 is detected, the input information includes the input coordinate information described above. On the other hand, when a touch input of the user to the touch panel 13 is not detected, the input information includes information indicating that there is no touch input. Next to step S3, the process in step S4 is executed.

In step S4, the processor 81 determines whether or not a drag operation has been newly started. Specifically, when a touch input to an object has been newly started and the under-operation flag is OFF, the processor 81 determines that a drag operation has been newly started. At this time, as input coordinate information indicating start coordinates included in drag operation information, the processor 81 stores, in the memory, input coordinate information indicating the input coordinates acquired in step S3 of the current process loop. On the other hand, when a touch input to an object is not newly started or when the under-operation flag is ON, the processor 81 determines that a drag operation is not newly started.

The determination as to whether or not a touch input to an object has been newly started can be performed based on the input information acquired in step S3. That is, in a case where the input information acquired in step S3 in the current process loop (i.e., the process loop from step S3 to step S17) indicates input coordinates present within the object while the input information acquired in step S3 in the previous process loop indicates that there is no touch input, the processor 81 determines that a touch input to the object has been newly started. Otherwise, the processor 81 determines that a touch input to the object is not newly started.

When the determination result in step S4 is positive, the process in step S5 is executed. When the determination result in step S4 is negative, the series of processes in steps S5 to S8 are skipped, and the process in step S9 described below is executed.

In step S5, the processor 81 sets an under-operation flag, which indicates that a drag operation is being executed, to ON. Although details will be described below, while the under-operation flag is ON, the object moves based on the input coordinates. Next to step S5, the process in step S6 is executed.

In step S6, the processor 81 (in other words, the object moving means 153) determines whether or not the start coordinates are located in any one of end areas that are set in a display region. That is, the processor 81 executes the determination process in step S6, based on the input coordinate information indicating the start coordinates, which is included in the drag operation information stored in the memory. When the determination result in step S6 is positive, the process in step S7 is executed. When the determination result in step S6 is negative, the process in step S7 is skipped, and the process in step S8 is executed.

In step S7, the processor 81 sets a second adjustment flag, which indicates that a second adjustment process is being executed, to ON. Although details will be described below, while the second adjustment flag is ON, the second adjustment process is executed. Next to step S7, the process in step S8 is executed.

In step S8, the processor 81 calculates the aforementioned start adjustment rate. The start adjustment rate is calculated according to the method described above in "[2-2-6. Third adjustment process]". While the drag operation is continued, the processor 81 stores, in the memory, the start adjustment rate calculated in step S8, and executes the third adjustment process (step S30) by using the start adjustment rate. Next to step S8, the process in step S9 is executed.

In step S9, the processor 81 determines whether or not the drag operation is being executed. The determination in step S9 is performed based on whether or not the under-operation flag is ON. When the determination result in step S9 is positive, the process in step S10 is executed. At this time, the processor 81 stores, in the memory, input coordinate information indicating the input coordinates acquired in step S3 in the current process loop, as input coordinate information indicating the current coordinates, which is included in the drag operation information. When the determination result in step S9 is negative, the series of processes in steps S10 and S11 are skipped, and the process in step S12 described below is executed.

In step S10, the processor 81 executes a correction vector calculation process. Hereinafter, the correction vector calculation process will be described in detail with reference to FIG. 21.

FIG. 21 is a sub flowchart showing an example of a specific flow of the correction vector calculation process in step S10 shown in FIG. 20. In the correction vector calculation process, first, in step S21, the processor 81 determines whether or not input coordinates have been acquired in the current process loop. That is, the processor 81 determines whether input information indicating input coordinates has been acquired or input information indicating that there is no touch input has been acquired, in the aforementioned step S3 in the current process loop. In the process in step S21, the case where input information indicating that there is no touch input is acquired, is the case where input coordinates become not to be acquired during the drag operation. When the determination result in step S21 is positive, the process in step S22 is executed. When the determination result in step S21 is negative, the series of processes in steps S22 to S31 are skipped, and the processor 81 ends the correction vector calculation process.

In step S22, the processor 81 (in other words, the change amount calculation means 152) calculates the aforementioned change amount. As described above, in the exemplary embodiment, the processor 81 calculates the aforementioned drag distance as the change amount. The drag distance is calculated based on the start coordinates and the current coordinates which are indicated by the drag operation information stored in the memory. Next to step S22, the process in step S23 is executed.

In step S23, the processor 81 (in other words, the object moving means 153) calculates the aforementioned correction basic value. The correction basic value is calculated based on the drag distance calculated in step S22, according to the method described above in "[2-2-2. Calculation of correction amount]". The processor 81 stores, in the memory, the correction basic value calculated during the drag operation. Next to step S23, the process in step S24 is executed.

In step S24, the processor 81 (in other words, the object moving means 153) calculates a correction vector. In step S24, the processor 81 calculates a correction vector before being adjusted by the first to third adjustment processes. That is, the processor 81 calculates a correction amount, based on the correction basic value, according to the method described above in "[2-2-2. Calculation of correction amount]". Further, the processor 81 calculates a correction vector that has the magnitude of the calculated correction amount and is directed in the correction direction set in step S2. At this time, the processor 81 stores, in the memory, correction vector information indicating the calculated correction vector. Next to step S24, the process in step S25 is executed.

In step S25, the processor 81 determines whether or not the second adjustment flag is set to ON. The determination process in step S25 is a process for determining whether or not the condition for executing the second adjustment process has been satisfied, that is, whether or not the input coordinates of the drag operation started in the end area are maintained in the end area. When the determination result in step S25 is negative, the process in step S26 is executed. When the determination result in step S25 is positive, the process in step S28 described below is executed.

In step S26, the processor 81 determines whether or not the current coordinates are located in any one of the end areas that are set in the display region. That is, the processor 81 executes the determination process in step S26, based on the input coordinate information indicating the current coordinates, which is included in the drag operation information stored in the memory. When the determination result in step S26 is positive, the process in step S27 is executed. When the determination result in step S26 is negative, the process in step S27 is skipped, and the process in step S31 described later is executed.

In step S27, the processor 81 (in other words, the object moving means 153) executes the first adjustment process. That is, the processor 81 calculates an end adjustment rate, based on the input coordinate information indicating the current coordinates, which is included in the drag operation information stored in the memory, according to the method described above in "[2-2-4. First adjustment process]". Then, using the calculated end adjustment rate, the processor 81 adjusts the correction vector calculated in step S24. At this time, the processor 81 stores, in the memory, the correction vector information indicating the adjusted correction vector. Next to step S27, the process in step S31 is executed.

Meanwhile, in step S28, the processor 81 determines whether or not the current coordinates are located in the end area where the start coordinates had been included. That is, the processor 81 executes the determination process in step S28, based on the input coordinate information indicating the current coordinates, which is included in the drag operation information stored in the memory. When the determination result in step S28 is positive, the process in step S29 is executed. When the determination result in step S28 is negative, the process in step S30 is executed.

In step S29, the processor 81 (in other words, the object moving means 153) executes the second adjustment process. That is, the processor 81 adjusts the correction vector calculated in step S24, according to the method described above in "[2-2-5. Second adjustment process]". At this time, the processor 81 stores, in the memory, correction vector information indicating the adjusted correction vector. Next to step S27, the process in step S31 is executed.

Meanwhile, in step S30, the processor 81 sets the second adjustment flag to OFF. Therefore, after the process in step S30 has been executed during one drag operation, the second adjustment process is not executed. Next to step S30, the process in step S31 is executed.

In step S31, the processor 81 (in other words, the object moving means 153) executes the third adjustment process. That is, the processor 81 adjusts the correction vector by using the start adjustment rate calculated in step S8, according to the method described above in "[2-2-6. Third adjustment process]". In step S31, the correction vector to be adjusted is the correction vector calculated in step S24, or the correction vector which is obtained by adjusting the correction vector calculated in step S24 through the first adjustment process (step S27) or the second adjustment process (step S29). The processor 81 stores, in the memory, correction vector information indicating the adjusted correction vector. After the process in step S31 has ended, the processor 81 ends the correction vector calculation process. When the correction vector calculation process in step S10 has ended, the process in step S11 is executed.

In step S11 shown in FIG. 20, the processor 81 (in other words, the object moving means 153) calculates object coordinates. That is, the processor 81 calculates the object coordinates, based on the correction vector calculated in step S10 and on the input coordinate information indicating the current coordinates, which is included in the drag operation information stored in the memory (see "[2-2-1. Outline of moving process]"). At this time, the processor 81 stores, in the memory, object information including the calculated object coordinates. Next to step S11, the process in step S12 is executed.

In step S12, the processor 81 determines whether or not input coordinates have been acquired in the current process loop. The determination process in step S12 is the same as the determination process in step S21. When the determination result in step S12 is negative, the process in step S13 is executed. At this time, the processor 81 counts the elapsed time from when input coordinates have become not to be acquired. When the determination result in step S12 is positive, the series of processes in steps S13 to S15 are skipped, and the process in step S16 described below is executed.

In step S13, the processor 81 determines whether or not the elapsed time, from when input coordinates have become not to be acquired, exceeds a predetermined continuation determination period. The continuation determination period has been defined in the information processing program in advance. When the determination result in step S13 is positive, the process in step S14 is executed. When the determination result in step S13 is negative, the series of processes in steps S14 and S15 are skipped, and the process in step S16 described below is executed.

In step S14, the processor 81 sets the under-operation flag to OFF, which means that the processor 81 determines that the drag operation has ended. Even after input coordinates have become not to be acquired during the drag operation, the drag operation is determined to be continued while the under-operation flag is not set to OFF in the process in step S14. Therefore, if input coordinates are acquired again during this period, the determination result in step S9 becomes positive, and object coordinates are calculated through the processes in steps S10 and S11, whereby the object is moved according to the drag operation. Next to step S14, the process in step S15 is executed.

In step S15, the processor 81 sets the second adjustment flag to OFF. Next to step S15, the process in step S16 is executed.

In step S16, the processor 81 (in other words, the object moving means 153) displays an image of a virtual space including an object. That is, the processor 81 generates an image representing a virtual space in which an object is placed at the object coordinates calculated in step S11, and displays the generated image on the display 12. In a case where the process loop from step S3 to step S17 is repeatedly executed, the process in step S16 is executed once every predetermined time period (e.g., every frame period). While the process loop is repeatedly executed, if the current coordinates of the drag operation move, the object coordinates calculated in step S11 change, so that the object is displayed so as to move. Next to step S16, the process in step S17 is executed.

In step S17, the processor 81 determines whether or not to end the object moving process. For example, the processor 81 determines whether or not the user has made an instruction to end display of the image of the virtual space in which the object is displayed. When the determination result in step S17 is negative, the process in step S3 is again executed. In the exemplary embodiment, the series of processes in steps S3 to S17 are repeatedly executed until the result of the determination process in step S17 becomes positive. When the determination result in step S17 is positive, the processor 81 ends the object moving process.

[4. Function and Effect of Exemplary Embodiment, and Modifications]

In the exemplary embodiment, the information processing program is a program for causing an object 161 displayed on a display device (i.e., the display 12) to move based on a drag operation performed by a user. The information processing program causes a computer (i.e., the processor 81) of an information processing apparatus (i.e., the main body apparatus 2) to function as the following means:

input coordinate acquisition means 151 configured to acquire input coordinates of the drag operation performed on the object;

change amount calculation means 152 configured to calculate a change amount (specifically, a drag distance) of the input coordinates from when the drag operation has been started; and object moving means 153 configured to move the object, based on the input coordinates during the drag operation.

The object moving means 153 moves the object while performing a correction to make the object away from the input coordinates so that the distance between the input coordinates (specifically, current coordinates) and the coordinates of the object becomes larger in the case where the change amount is large ((c) of FIG. 11) than in the case where the change amount is small ((b) of FIG. 11).

As for the above condition that "so that the distance between the input coordinates and the coordinates of the object becomes larger in the case where the change amount is large than in the case where the change amount is small", this condition may be satisfied when the change amount has a specific value, and is not necessarily satisfied for all the values within a range of possible change amounts. For example, it can be said that the above condition is satisfied when "the object moving means 153 moves the object while performing a correction to make the object away from the input coordinates so that the distance between the input coordinates and the coordinates of the object becomes larger in the case where the change amount is a first value than in the case where the change amount is a second value smaller than the first value".

As described above, according to the exemplary embodiment, when the change amount is large, since the object is away from the input coordinates, the object during the drag operation can be displayed in an easy-to-view manner. On the other hand, when the change amount is small, since the object and the input coordinates are placed relatively close to each other (may be placed at the same position), the user can easily perform a drag operation of slightly moving the object. Thus, operability of the drag operation can be improved.

The object to be an operation target of a drag operation may be any object. For example, the object may be a game object (e.g., a player character, an item, or a block in a puzzle game) placed in a virtual game space. Alternatively, the object may be an object other than a game object. For example, the object may be an icon placed in a menu screen or a window of a personal computer or a smart phone. Thus, without being limited to the use for games, the exemplary embodiment can be used for various applications.

The object moving means 153 may execute the process of changing the distance between input coordinates and an object according to a change amount, only for a predetermined type of object among objects (objects that can be subjected to a drag operation) placed in the virtual space. As for an object other than the predetermined type of object, the object moving means 153 may move this object according to a drag operation with the distance between the input coordinates and the object being kept constant. The predetermined type of object is, for example, an object having a display size equal to or smaller than a predetermined value. As for an object having a relatively small display size, if the most part of the object is hidden behind a finger performing the drag operation, the object is highly likely to be difficult to be viewed. Meanwhile, as for an object having a relatively large display size, even if a part of the object is hidden behind the finger performing the drag operation, the object is unlikely to be difficult to be viewed. Therefore, the process of changing the distance between the input coordinates and the object according to the change amount may be executed only for the object having a display size equal to or smaller than the predetermined value.

(Modifications Regarding Change Amount)

In the above exemplary embodiment, the game system 1 changes the distance between input coordinates (specifically, current coordinates) and an object according to a change amount (specifically, a drag distance). In another embodiment, the game system 1 may change the distance between input coordinates and an object according to an elapsed time from when a drag operation has been started, instead of the change amount. That is, the game system 1 may include elapsed-time calculation means configured to calculate an elapsed time from when a drag operation has been started, instead of the change amount calculation means. In this case, the object moving means 153 moves the object while performing a correction to make the object away from the input coordinates so that the distance between the input coordinates and the coordinates of the object becomes larger in the case where the elapsed time is long than in the case where the elapsed time is short.

According to the above modification, when the elapsed time is long, since the object is away from the input coordinates, the object during the drag operation can be displayed in an easy-to-view manner. On the other hand, when the elapsed time is short (i.e., when it is assumed that the change amount is small), the user can easily perform a drag operation of slightly moving the object by decreasing the distance between the object and the input coordinates (this distance may be 0). Therefore, also in the above modification, as in the above exemplary embodiment, operability of the drag operation may be improved. The elapsed-time calculation means may count time during a period when a drag operation is substantially performed (specifically, during a period when input coordinates of a drag operation are moving), and may not count time during a period when a drag operation is not substantially performed (specifically, during a period when input coordinates of a drag operation are stopped).

In another embodiment, the distance between the input coordinates and the coordinates of the object may be set based on both the change amount and the elapsed time.

As described above, the information processing program enables setting of a distance between input coordinates and an object, based on an index, such as the change amount or the elapsed time, which increases as a drag operation is continued. Thus, operability of the drag operation can be improved.

As described above, the exemplary embodiment is applicable to, for example, an information processing program or an information processing system for the purpose of, for example, improving operability of a drag operation.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer readable storage medium having stored therein instructions that, when executed, cause a processor of an information processing apparatus to move an object displayed on a display device based on a drag operation performed by a user, by performing operations comprising:
   acquiring input coordinates of the drag operation performed on the object;
   calculating a change amount of the input coordinates from when the drag operation has been started;
   causing the object to move based on the input coordinates during the drag operation, such that the object is caused to move while a correction is performed to move the object away from the input coordinates so that a distance between the input coordinates and coordinates of the object becomes larger in a case where the change amount is large compared to a case where the change amount is small, wherein an amount of the correction is changed during the drag operation; and
   adjusting a direction and the amount of the correction so that, on a condition where the input coordinates during the drag operation are within a first non-zero distance from an end of a display region of the display device, and on a condition where the coordinates of the object during the drag operation are within the first distance from the end of the display region of the display device, a post-correction position of the object approaches the end, the amount of the correction being changed during drag operation as a result of the adjusting.

2. The non-transitory computer readable storage medium according to claim 1, wherein:
   the input coordinates are repeatedly acquired during the drag operation, and
   the change amount is calculated based on a difference from the input coordinates at which the drag operation is started to the input coordinates at present.

3. The non-transitory computer readable storage medium according to claim 2, wherein:
   the object is placed at coordinates that are obtained by correcting the input coordinates by basing the correction amount on the change amount, and
   the correction amount is calculated based on a maximum value of the difference during the drag operation.

4. The non-transitory computer readable storage medium according to claim 1, wherein the change amount is calculated based on an accumulated movement distance of the input coordinates during the drag operation.

5. The non-transitory computer readable storage medium according to claim 1, wherein the object is caused to move while maintaining a positional relation between the input coordinates and coordinates of the object, during a period in which the change amount is equal to or smaller than a threshold value from when the drag operation is started.

6. The non-transitory computer readable storage medium according to claim 1, wherein an upper limit is set on the distance between the input coordinates and the coordinates of the object during the drag operation.

7. The non-transitory computer readable storage medium according to claim 1, wherein in a case where the input coordinates at which the drag operation is started are on the same side as a direction of the correction with respect to an axis that passes a reference position within the object, the amount of the correction is set during the drag operation to be larger on the same side as the direction of the correction, as compared to a case where the input coordinates are on a side opposite to the direction of the correction with respect to the axis.

8. The non-transitory computer readable storage medium according to claim 1, wherein the object is placed at a position, in an image displayed on the display device, in an obliquely upper direction with respect to the input coordinates during the drag operation.

9. The non-transitory computer readable storage medium according to claim 1, wherein:
   a determination is made as to whether a hand of the user performing the drag operation is a right hand or a left hand,
   the object is placed at a position in an upper left direction with respect to the input coordinates during the drag operation when the hand of the user performing the drag operation has been determined to be the right hand, wherein the upper left direction is set based on an image displayed on the display device, and
   the object is placed at a position in an upper right direction with respect to the input coordinates during the drag operation when the hand of the user performing the drag operation has been determined to be the left hand, wherein the upper right direction is set based on the image displayed on the display device.

10. The non-transitory computer readable storage medium according to claim 1, wherein in a case where the input coordinates during the drag operation or the coordinates of the object are within the first distance from the end of the display region and the direction of the correction before being adjusted is opposite to a direction from the input coordinates to the end of the display region, the direction of the correction is adjusted so that the position, of the object, based on the direction of the correction approaches the end.

11. The non-transitory computer readable storage medium according to claim 1, wherein at least on a condition that the input coordinates during the drag operation are at a position within a second distance from the end of the display region of the display device, the amount of the correction is decreased.

12. The non-transitory computer readable storage medium according to claim 1, wherein while the respective input coordinates or the respective coordinates of the object from when the drag operation has been started are within a range of a third distance in a normal direction of a display region of the display device from an end of the display region, the object is placed at coordinates that are obtained by correcting the input coordinates during the drag operation, in a direction perpendicular to the normal direction, by basing correction amount on the change amount.

13. The non-transitory computer readable storage medium according to claim 1, wherein while the respective input coordinates or the respective coordinates of the object from when the drag operation has been started are within a range of a forth distance from an end of a display region of the display device, the object is placed at the position of the input coordinates during the drag operation.

14. The non-transitory computer readable storage medium according to claim 1, wherein:
the input coordinates are repeatedly acquired, and
when the input coordinates are acquired again within a first time period from when the input coordinates of the drag operation have become not to be acquired, the change amount for the drag operation is continuously calculated.

15. The non-transitory computer readable storage medium according to claim 1, wherein the input coordinates are acquired from a touch panel provided on a screen of the display device.

16. The non-transitory computer readable storage medium according to claim 1, wherein the amount of correction increases in accordance with a predefined formula as the change amount is increased between first and second thresholds, no correction is applied when the change amount is below the first threshold, and the amount of correction is held constant when the change amount is above the second threshold.

17. The non-transitory computer readable storage medium according to claim 1, wherein:
during a drag operation, the input coordinates are first moved to a first position that is a first distance away from where the drag operation started and are then moved to a second position that is a second distance away from where the drag operation started, the second distance being smaller than the first distance, and
the correction amount is calculated based on the first distance.

18. A non-transitory computer readable storage medium having stored therein instructions that, when executed, cause a processor of an information processing apparatus to move an object displayed on a display device based on a drag operation performed by a user, by performing operations comprising:
acquiring input coordinates of the drag operation performed on the object;
calculating an elapsed time from when the drag operation has been started;
causing the object to move based on the input coordinates during the drag operation, such that the object is caused to move while a correction is performed to move the object away from the input coordinates so that a distance between the input coordinates and coordinates of the object becomes larger in a case where the elapsed time is long compared to a case where the elapsed time is short, wherein an amount of the correction is changed during the drag operation; and
adjusting a direction and the amount of the correction so that, on a condition where the input coordinates during the drag operation are within a first non-zero distance from an end of a display region of the display device, and on a condition where the coordinates of the object during the drag operation are within the first distance from the end of the display region of the display device, a post-correction position of the object approaches the end, the amount of the correction being changed during drag operation as a result of the adjusting.

19. An information processing apparatus configured to cause an object displayed on a display device to move based on a drag operation performed by a user, the information processing apparatus including at least one processor, the processor being configured to perform operations comprising:
acquiring input coordinates of the drag operation performed on the object;
calculating a change amount of the input coordinates from when the drag operation has been started;
causing the object to move based on the input coordinates during the drag operation, such that the object is caused to move while a correction is performed to move the object away from the input coordinates so that a distance between the input coordinates and coordinates of the object becomes larger in a case where the change amount is large than in a case where the change amount is small, wherein an amount of the correction is changed during the drag operation; and
adjusting a direction and the amount of the correction so that, on a condition where the input coordinates during the drag operation are within a first non-zero distance from an end of a display region of the display device, and on a condition where the coordinates of the object during the drag operation are within the first distance from the end of the display region of the display device, a post-correction position of the object approaches the end, the amount of the correction being changed during drag operation as a result of the adjusting.

20. An information processing system configured to cause an object displayed on a display device to move based on a drag operation performed by a user, the information processing system including at least one processor, the processor being configured to perform operations comprising:
acquiring input coordinates of the drag operation performed on the object;
calculating a change amount of the input coordinates from when the drag operation has been started;
causing the object to move based on the input coordinates during the drag operation, such that the object is caused to move while a correction is performed to move the object away from the input coordinates so that a distance between the input coordinates and coordinates of the object becomes larger in a case where the change amount is large compared to a case where the change amount is small, wherein an amount of the correction is changed during the drag operation; and adjusting a direction and the amount of the correction so that, on a condition where the input coordinates during the drag operation are within a first non-zero distance from an end of a display region of the display device, and on a condition where the coordinates of the object during the drag operation are within the first distance from the end of the display region of the display device, a post-correction position of the object approaches the end, the amount of the correction being changed during drag operation as a result of the adjusting.

21. An information processing method to be executed in an information processing system configured to cause an object displayed on a display device to move based on a drag operation performed by a user, the method comprising:

acquiring input coordinates of the drag operation performed on the object;

calculating a change amount of the input coordinates from when the drag operation has been started;

causing the object to move based on the input coordinates during the drag operation, such that the object is caused to move while a correction is performed to move the object away from the input coordinates so that a distance between the input coordinates and coordinates of the object becomes larger in a case where the change amount is large compared to a case where the change amount is small, wherein an amount of the correction is changed during the drag operation; and adjusting a direction and the amount of the correction so that, on a condition where the input coordinates during the drag operation are within a first non-zero distance from an end of a display region of the display device, and on a condition where the coordinates of the object during the drag operation are within the first distance from the end of the display region of the display device, a post-correction position of the object approaches the end, the amount of the correction being changed during drag operation as a result of the adjusting.

\* \* \* \* \*